United States Patent
Aoyama et al.

[11] Patent Number: 6,147,732
[45] Date of Patent: Nov. 14, 2000

[54] DOT MATRIX-TYPE DISPLAY DEVICE WITH OPTICAL LOW-PASS FILTER FIXED TO A MEMBER VIA AN ADHESIVE BONDING

[75] Inventors: Shigeru Aoyama, Kyoto; Osamu Nishizaki, Takatsuki, both of Japan

[73] Assignee: Omron Corporation, Kyoto, Japan

[21] Appl. No.: 08/519,805

[22] Filed: Aug. 24, 1995

[30] Foreign Application Priority Data

Aug. 26, 1994 [JP] Japan ................................ 6-224002
Jan. 26, 1995 [JP] Japan ................................ 7-028904

[51] Int. Cl.⁷ .............................................. G02F 1/1335
[52] U.S. Cl. .............................................. 349/112
[58] Field of Search ................................. 349/112, 117, 349/137, 162; 348/833; 354/599, 525, 626

[56] References Cited

U.S. PATENT DOCUMENTS

| | | | |
|---|---|---|---|
| 4,101,929 | 7/1978 | Ohneda et al. | 358/44 |
| 4,150,878 | 4/1979 | Barzilai et al. | 350/344 |
| 4,178,611 | 12/1979 | Okano | 358/44 |
| 4,336,978 | 6/1982 | Suzuki . | |
| 4,634,219 | 1/1987 | Suzuki | 350/162.22 |
| 4,804,253 | 2/1989 | Stewart | 359/104 |
| 4,953,952 | 9/1990 | Okumura et al. | 350/337 |
| 5,046,827 | 9/1991 | Frost et al. | 359/54 |
| 5,249,041 | 9/1993 | Shiraishi et al. | 358/44 |
| 5,280,347 | 1/1994 | Shiraishi et al. | 358/41 |
| 5,359,684 | 10/1994 | Hosokawa et al. | 385/33 |
| 5,461,418 | 10/1995 | Shiraishi | 348/291 |
| 5,609,939 | 3/1997 | Petersen et al. | 428/41 |
| 5,629,784 | 5/1997 | Abileah et al. | 349/112 |

FOREIGN PATENT DOCUMENTS

| | | |
|---|---|---|
| 0409188 | 1/1991 | European Pat. Off. . |
| 0582998 | 2/1994 | European Pat. Off. . |
| 24 35 422 | 10/1975 | Germany . |
| 6-90484 | 5/1985 | Japan . |
| 63-114475 | 5/1988 | Japan . |
| 4-366917 | 12/1992 | Japan . |
| 6-252371 | 9/1994 | Japan . |

OTHER PUBLICATIONS

Patent Abstract of Japan, JP 06 058810, Mar. 1994.
Patent Abstract of Japan, JP 04 246859, Sep. 1992.
Patent Abstract of Japan, JP 61 272723, Dec. 1986.
Patent Abstract of Japan, JP 63 261323, Oct. 1988.
Patent Abstract of Japan, JP 05 002151, Jan. 1993.

*Primary Examiner*—Kenneth Parker
*Attorney, Agent, or Firm*—Foley & Lardner

[57] ABSTRACT

In a liquid crystal display device having an optical low-pass filter provided on a display screen, the optical low-pass filter is fixed to a liquid-crystal panel or a polarizing plate through a bonding layer having a refractive index different from the refractive index of the optical low-pass filter in a state where a surface having an optical function of the optical low-pass filter is directed toward a liquid-crystal panel or the polarizing plate. Further, in a liquid crystal display device having a phase plate, an optical low-pass filter is integrally formed on a phase plate. The occurrence of rainbow-shaped interference fringes is prevented. A liquid crystal display device is miniaturized and the number of components thereof is reduced. The fabrication precision of an optical low-pass filter is improved.

7 Claims, 41 Drawing Sheets

DOT MATRIX-TYPE DISPLAY DEVICE WITH OPTICAL LOW-PASS FILTER FIXED TO A MEMBER VIA AN ADHESIVE BONDING

BACKGROUND OF THE INVENTION

1. Field of the Invention

The present invention relates to an optical low-pass filter, a dot matrix-type image display device utilizing the optical low-pass filter, another apparatus utilizing the optical low-pass filter, and an optical component used in the display device.

2. Description of the Background Art

In a dot matrix-type image display device displaying an image by a number of pixels (picture elements) arranged in two dimensions, for example, a liquid-crystal panel, such a phenomenon that so-called sampling noise due to the periodic arrangement of the pixels appears, and degrading the quality of the image is observed.

It has been proposed that a phase grating functioning as an optical low-pass filter is arranged on a display screen of the dot matrix-type image display device in order to reduce or remove the sampling noise (for example, Japanese Patent Laid-Open Publication No. 63-114475). The optical low-pass filter passes spatial frequency components lower than the frequency defined by the pitch between pixels (the pitch between dots) in the dot matrix-type image display device.

When the display screen of the dot matrix-type image display device and the optical low-pass filter are distorted, or are inclined when they are bonded in a state where dust or foreign matter is sandwiched therebetween (the parallel state is not correctly kept), rainbow-shaped interference fringes occur, resulting in lowered reproducibility of the image.

A liquid-crystal panel which is a representative of the dot matrix-type image display device is applied to electronic equipment such as a view finder of a video camera and a portable television. The electronic equipment require such miniaturization that they are easy to carry and require reduction in cost. In order to miniaturize the liquid-crystal panel and simplify the assembling processes thereof, it is desired that the liquid-crystal panel and the optical low-pass filter are joined and integrated. It is one of inevitable technical problems to prevent the above described occurrence of the interference fringes in this case.

On the other hand, the grating thickness of the optical low-pass filter requires fabrication precision on the order of 0.01 μm, whereby the fabrication thereof is difficult and the yield thereof is bad.

Furthermore, in a liquid crystal display device using an STN (Super Twisted Nematic) liquid crystal, a phase plate is required to convert elliptically polarized light into linearly polarized light to improve the contrast. If the phase plate and an optical low-pass filter are further mounted on the liquid crystal display device, the structure of the liquid crystal display device is forced to be complicated.

SUMMARY OF THE INVENTION

An object of the present invention is to prevent the occurrence of interference fringes in a case where an optical low-pass filter is provided in a dot matrix-type image display device.

Another object of the present invention is to provide a dot matrix-type image display device which is integrated with an optical low-pass filter.

Still another object of the present invention is to equivalently improve the fabrication precision of an optical low-pass filter.

A further object of the present invention is to provide a liquid crystal display device having a simpler structure.

The present invention provides a dot matrix-type image display device having an optical low-pass filter.

In this dot matrix-type display device, the optical low-pass filter is fixed to a member of the display device through an adhesive bonding layer (hereinafter referred to as a bonding layer) having a different refractive index from the refractive index of the optical low-pass filter in a state where a surface having an optical function of the optical low-pass filter is directed toward the member of the display device.

The member of the display device is a glass substrate of a liquid-crystal panel or a polarizing plate in a liquid crystal display device, for example.

The bonding layer is a concept including "an adhesive layer" and "a pressure sensitive adhesive layer (hereinafter referred to as an adhesive layer)".

According to the present invention, the bonding layer is provided in a space between the optical low-pass filter and the member of the display device, whereby no dust, foreign matter or the like is included into the space. Accordingly, it is possible to hold the optical low-pass filter and the member of the display device parallel to each other, thereby to make it possible to prevent the occurrence of rainbow-shaped interference fringes.

Furthermore, a surface having an optical function, that is, a surface patterned by many projections and depressions of the optical low-pass filter is covered with the bonding layer, thereby to make it possible to prevent dust from adhering on the surface patterned by many projections and depressions as well as not to damage the surface patterned by many projections and depressions at the time of assembling.

Additionally, the optical low-pass filter is integrated with the member of the display device by the bonding layer, thereby to make it possible to miniaturize the display device and reduce the number of components thereof. The number of operations such as an adjustment in the assembling processes can be reduced, whereby high yield can be expected.

Since the refractive index of the bonding layer is greater than the refractive index of air, the difference in refractive indexes between the optical low-pass filter and the bonding layer is smaller than the difference in refractive indexes between the optical low-pass filter and air. Therefore, it is possible to increase the grating thickness of the optical low-pass filter, whereby required precision is eased. This makes it possible to equivalently improve the fabrication precision of the optical low-pass filter.

The external shape of the optical low-pass filter is made smaller than the external shape of the display device or the member of the display device, whereby the necessity of a mechanism for supporting the optical low-pass filter is eliminated merely by providing in the display device a mechanism for supporting the member of the display device. Further, it is possible to prevent a part of the bonding layer from protruding beyond the member of the display device.

The thickness of the optical low-pass filter is made smaller than the thickness of the display device or the member of the display device, thereby to make it possible to prevent the warping of the member of the display device and the peeling of the optical low-pass filter off.

A side groove is formed on the outer periphery portion of the surface having an optical function of the optical low-pass filter, thereby to make it possible to prevent a bonding resin from sticking out.

In order to keep the spacing between the optical low-pass filter and the member of the display device constant, a sidewall may be formed on the outer periphery portion of the surface having an optical function of the optical low-pass filter, or a spacer composed of a material having a refractive index approximately equal to that of the bonding layer may be provided between the surface having an optical function of the optical low-pass filter and the member of the display device.

The present invention provides a dot matrix-type image display device comprising a phase plate.

In a dot matrix-type image display device, an optical low-pass filter is integrally formed on a phase plate.

In one mode, a diffraction grating optically functioning as the optical low-pass filter is formed on one surface of the phase plate. In another mode, the optical low-pass filter is formed on one surface of the phase plate by resin molding.

A concrete example of the dot matrix-type image display device is a liquid crystal display device. The liquid crystal display device comprises a liquid-crystal panel and polarizing plates arranged on both sides of the liquid-crystal panel. The phase plate on which the optical low-pass filter is integrally formed is provided between the liquid-crystal panel and one of the polarizing plates.

According to the present invention, the optical low-pass filter is integrally formed on the phase plate, whereby the number of components to be assembled is decreased by one, thereby to simplify the structure of the dot matrix-type display device.

In a preferred mode, the phase plate on which the optical low-pass filter is integrally formed is fixed to the member of the display device (for example, the liquid-crystal panel or the polarizing plates) through the bonding layer. Consequently, the number of components to be attached to a frame or the like is decreased, thereby to make it easier to assemble the dot matrix-type display device.

In any of the above described dot matrix-type image display devices, various devices are used to prevent light from being reflected from the vicinity of a display screen of the display device.

The first device is to make the refractive index of the bonding layer provided between the surface having an optical function of the optical low-pass filter and the member of the display device and the refractive index of the member of the display device substantially equal.

Alternatively, the first device is to make, when a surface on the opposite side of the surface having an optical function of the optical low-pass filter is fixed to the member of the display device through the bonding layer, the refractive index of the bonding layer substantially equal to the refractive index of the optical low-pass filter.

To sum up, the first device is to reduce the difference in refractive indexes in the interface of the members.

The second device is to form an anti-reflection film on a flat surface of the member of the display device or the optical low-pass filter. The anti-reflection film can be composed of a single film or a plurality of thin films.

The third device is to subject a flat surface of the member of the display device or the optical low-pass filter to anti-glare processing.

The fourth device is to take an end face of the optical low-pass filter as a light scattering surface.

The fifth device is to take an end face of the optical low-pass filter as a light absorbing surface.

The present invention further provides an optical low-pass filter having the above described features.

The most distinctive optical low-pass filter is so constructed that an adhesive layer is formed on a surface having an optical function of the optical low-pass filter, and the outer surface of the adhesive layer is covered with a separator.

The adhesive layer may be also formed on a surface opposite to the surface having an optical function of the optical low-pass filter, and the outer surface of this adhesive layer may be covered with a separator.

The optical low-pass filter can be fixed to the member of the display device by stripping the separator, whereby the assembling thereof is easy.

The present invention further provides an optical low-pass filter integrally formed on one surface of a polarizing plate.

The present invention further provides a polarizing plate comprising a polarizer and protective layers formed on both surfaces of the polarizer, an optical low-pass filter being integrally formed on either one of the protective layers.

Specifically, in order to integrally form the optical low-pass filter on one of the protective layers, a diffraction grating optically functioning as the optical low-pass filter is formed on an outer surface of the protective layer, or the optical low-pass filter is formed on an outer surface of the protective layer by resin molding.

Preferably, an adhesive layer is formed on at least one surface of the polarizing plate, and the outer surface of the adhesive layer is covered with a separator. The polarizing plate can be easily fixed to the member of the display device by stripping the separator.

The present invention provides a method of fabricating the polarizing plate. The fabricating method comprises the steps of integrally forming an optical low-pass filter on one surface of a protective layer and affixing the protective layer to a polarizer.

In one mode, the optical low-pass filter is formed on one surface of the protective layer by embossing. In another mode, the optical low-pass filter is formed on one surface of the protective layer by resin molding.

A pressure sensitive adhesive resin (hereinafter referred to as an adhesive resin) may be further applied to at least one surface of the polarizing plate, and a separator may be affixed to an outer side surface of the adhesive resin.

The present invention further provides an optical device comprising a polarizer and an optical low-pass filter bonded to one surface of the polarizer through a bonding layer. Preferably, an adhesive layer is formed on at least one surface of the optical device, and the outer surface of the adhesive layer is covered with a separator.

The present invention further provides an optical device constructed by integrally forming an optical low-pass filter on a phase plate. The optical device is suitably used in a liquid crystal display device.

Specifically, in the optical device, a diffraction grating optically functioning as the optical low-pass filter is formed on one surface of the phase plate, or the optical low-pass filter is formed on one surface of the phase plate by resin molding.

When a polarizing plate is bonded to one surface of the optical device through a bonding layer, it is easier to assemble the liquid crystal display device.

In order to prevent light from being reflected, an anti-reflection film may be formed on one surface of the optical device, or one surface of the optical device may be subjected to anti-glare processing.

In a more preferred mode, an adhesive layer is formed on at least one surface of the optical device, and the outer surface of the adhesive layer is covered with a separator.

Applications of the optical low-pass filter and the phase plate include a portable television, a liquid crystal display device, a view finder, a TV projector, an image display system, and a head mount display device.

The optical low-pass filter can be also fixed to an imaging surface of an imaging device.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
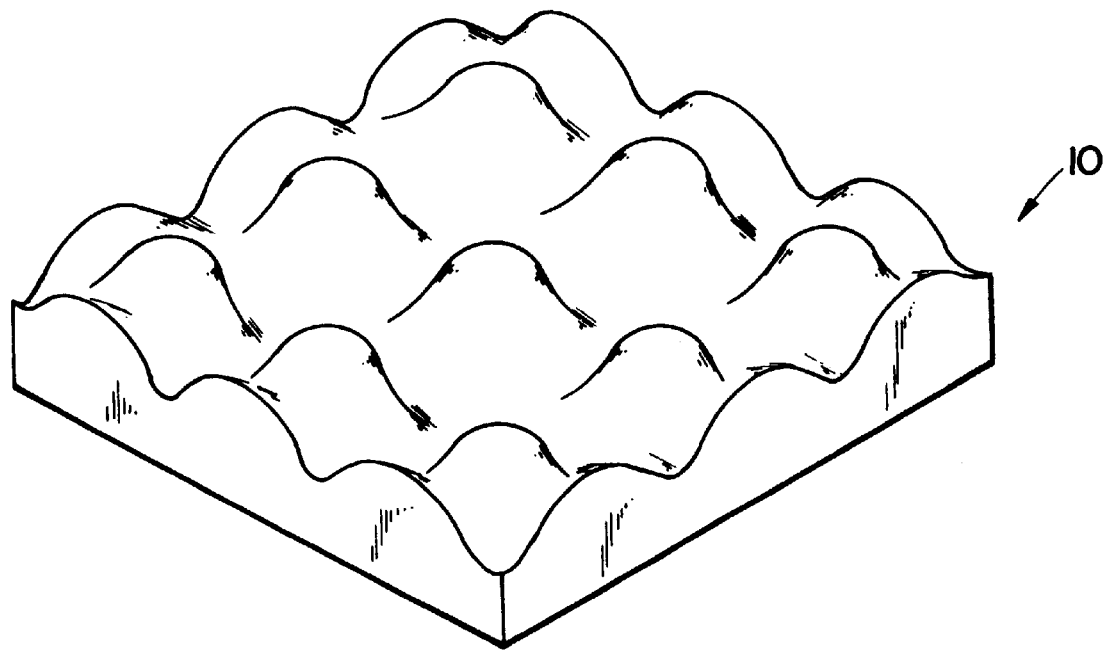
FIG. 1 is a perspective view showing a sinusoidal wave-shaped optical low-pass filter.
Figure 2:
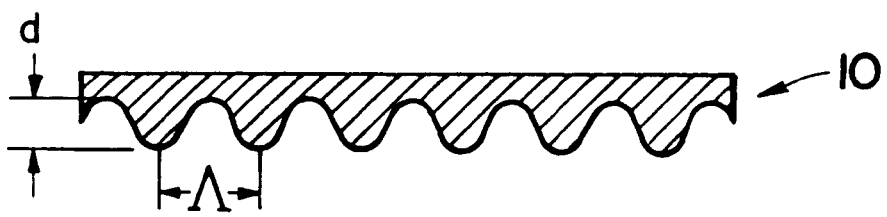
FIG. 2 is a cross-sectional view showing the sinusoidal wave-shaped optical low-pass filter.

FIG. 1 illustrates a part of a sinusoidal wave-shaped optical low-pass filter in an enlarged manner, and FIG. 2 illustrates a cross section thereof.

The optical low-pass filter 10 is one type of phase grating, and has projections and depressions exhibiting sinusoidal waveforms formed in two dimensions and continuously in a predetermined period on its one surface. The cross section of the sinusoidal wave-shaped optical low-pass filter 10 assumes a sinusoidal wave shape in any direction. The period (the pitch) of a sinusoidal wave in one direction and the period of a sinusoidal wave in a direction perpendicular thereto may be the same or different. The cut-off spatial frequency of the optical low-pass filter 10 is defined by the pitch Λ and the grating thickness d. The sinusoidal wave-shaped optical low pass filter 10 is said to have superior optical low-pass filtering characteristics.

FIGS. 3 to 8 illustrate other examples of the optical low-pass filter.

Figure 3:
FIG. 3 is a cross-sectional view showing another example of the optical low-pass filter.

An optical low-pass filter 10A shown in FIG. 3 is one having quadrangular pyramid-shaped projections (which are triangular in cross section) formed in two dimensions and continuously on its one surface.

Figure 4:
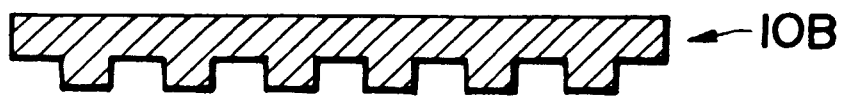
FIGS. 4 to 8 are cross-sectional views showing still other examples of the optical low-pass filter.

An optical low-pass filter 10B shown in FIG. 4 is one of a so-called step type, which has rectangular parallelopiped-shaped (cube-shaped) projections (which are rectangular in cross section) formed in two dimensions and continuously on its one surface.

Figure 5:

An optical low-pass filter 10C shown in FIG. 5 is called a prism plate, which has quadrangular pyramid-shaped prisms formed spaced apart from each other in two directions perpendicular to each other on its one surface.

Figure 6:
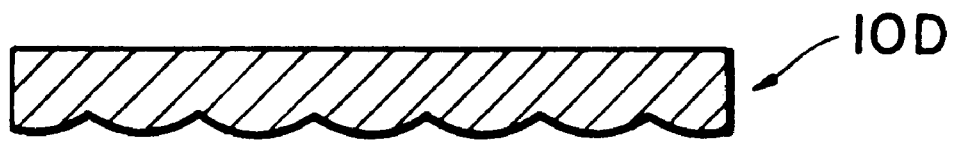

An optical low-pass filter 10D shown in FIG. 6 has convex surfaces each constituting a part of a spherical surface formed in a predetermined period in two directions perpendicular to each other on its one surface.

Figure 7:
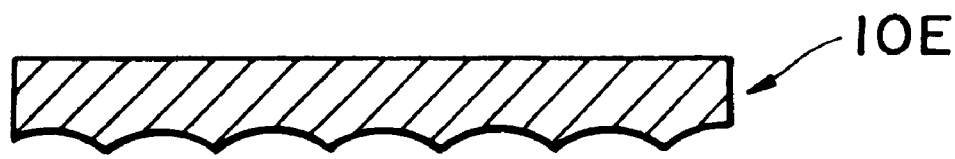

An optical low-pass filter 10E shown in FIG. 7 has such a shape that projections and depressions of the optical low-pass filter 10D of FIG. 6 are reversed, which has concave surfaces each constituting a part of a spherical surface arranged in a predetermined period in two directions perpendicular to each other on its one surface.

Figure 8:
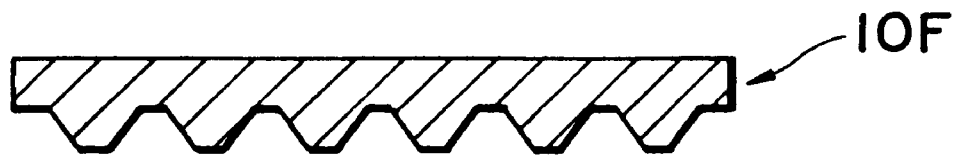

An optical low-pass filter 10F shown in FIG. 8 has such a shape that the quadrangular pyramid-shaped prisms of the optical low-pass filter shown in FIG. 5 are truncated.

The optical low-pass filters can be fabricated by cutting, injection molding, forming using a stamper, or sheet-forming followed by embossing with a pattern of projections and depressions, for example. Examples of materials of the optical low-pass filters include glass and transparent resins such as polymethyl metacrylate (hereinafter referred to as PMMA) (generally, an acrylic resin), a UV-setting resin (a resin that is hardened by UV radiation), and polycarbonate (hereinafter referred to as PC).

In the following description, a sinusoidal wave-shaped optical low-pass filter is used and illustrated as a representative of the optical low-pass filters.

Figure 9:
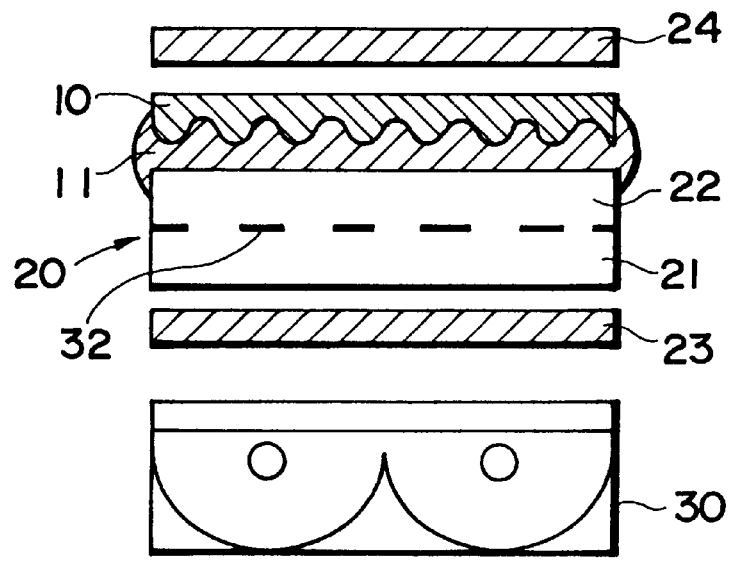
FIG. 9 is a cross-sectional view schematically showing a structure of a liquid crystal display device.

FIG. 9 schematically illustrates a structure of a liquid crystal display device. In FIG. 9, components such as a liquid-crystal panel are depicted in a significantly enlarged manner across the thickness thereof, while being depicted in a significantly reduced manner across the length (or width) thereof (the number of pixels or the number of dots is significantly small) for convenience of drawing and for easy of understanding. This is also applied to other figures.

A liquid-crystal panel 20 has two glass substrates 21 and 22, and the small spacing between the glass substrates 21 and 22 is filled with a liquid crystal. A broken line depicted between the two glass substrates 21 and 22 represents a black matrix 32 (the details thereof will be described later).

An optical low-pass filter 10 is bonded to the outer surface of the one glass substrate 22 of the liquid-crystal panel 20 with its surface defined by projections and depressions exhibiting two-dimensional sinusoidal waveforms (its surface having an optical function) directed toward the glass substrate 22 by a bonding (adhesive) layer 11. The glass substrate 22 and the optical low-pass filter 10 are arranged correctly parallel to each other.

The bonding layer 11 is composed of a bonding (adhesive) resin such as a UV-setting resin or an epoxy resin.

Polarizing plates (polarizers) 23 and 24 are arranged on both sides of the liquid-crystal panel 20 having the optical low-pass filter 10 bonded to its one surface, and a light source (a back light) 30 is arranged on one side of the liquid-crystal panel 20, thereby constructing a liquid crystal display device.

Figure 11:
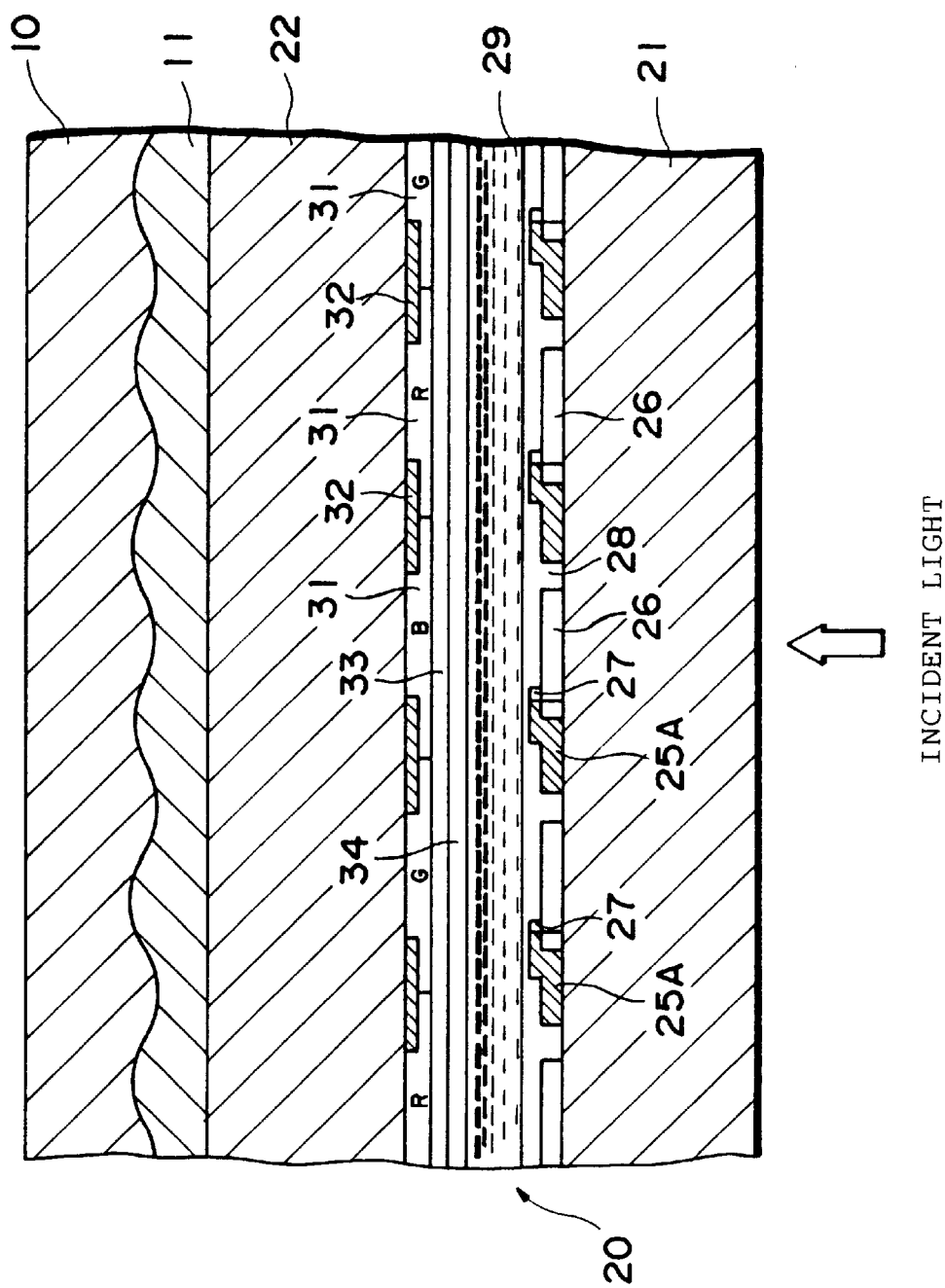
FIG. 11 is an enlarged cross-sectional view showing the liquid crystal display device.
Figure 12:
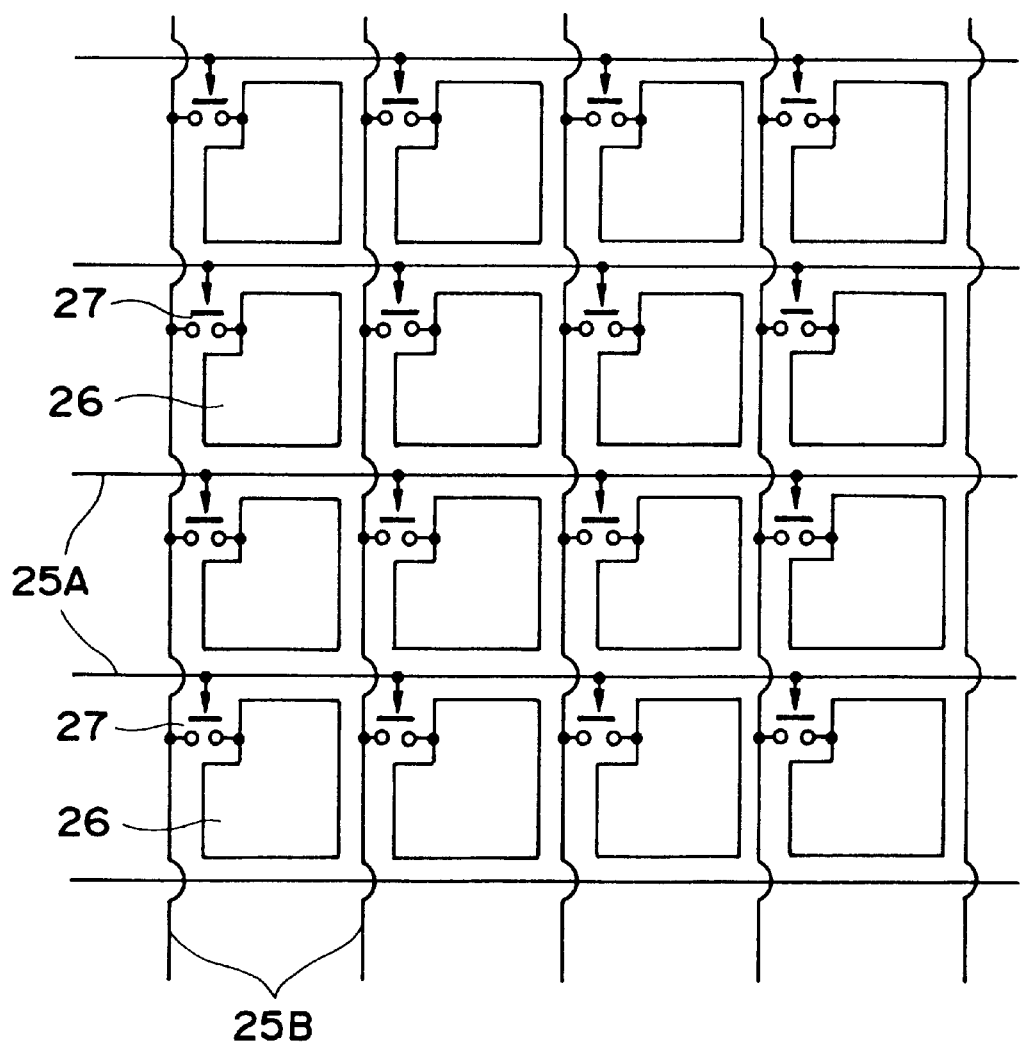
FIG. 12 is an equivalent circuit diagram showing wiring patterns on glass substrates of the liquid crystal display device.

FIG. 11 schematically illustrates a portion of an enlarged cross section of a liquid-crystal panel 20 and an optical low-pass filter 10 bonded thereto. An insulating film and the internal structure of switching elements are not illustrated in FIG. 11. FIG. 12 shows an equivalent circuit of pixel electrodes, switching elements and conductive wiring patterns which are formed on the surface of one of two glass substrates 21 and 22 constituting the liquid-crystal panel 20.

Referring to FIGS. 11 and 12, the liquid-crystal panel 20 basically comprises two glass substrates 21 and 22 arranged with small spacing (e.g., on the order of 5 $\mu$m) therebetween and a liquid crystal 29 with which the gap between the glass substrates 21 and 22 is filled.

A number of uniformly spaced, horizontally extending scanning electrodes 25A and a number of uniformly spaced, vertically extending signal electrodes 25B are formed on the inner surface of the one glass substrate 21. The scanning electrodes 25A and the signal electrodes 25B are insulated from each other (the signal electrodes 25B are not illustrated in FIG. 11).

Pixel electrodes 26 are formed in a matrix configuration and in a mutually insulated state in areas delimited by the scanning electrodes 25A and the signal electrodes 25B on the inner surface of the glass substrate 21. Each of the pixel electrodes 26 is connected to the adjacent signal electrode 25B via a three-terminal switching element (a thin-film transistor comprising an FET (Field Effect Transistor, for example) 27. Each of the switching elements 27 has a control terminal (e.g., a gate terminal) connected to the adjacent scanning electrode 25A. Further, an alignment film 28 is formed on the entire inner surface of the glass substrate 21 so as to cover the electrodes 25A, 25B and 26.

Formed on the inner surface of the other glass substrate 22 are R, G and B color filters 31 at positions respectively opposed to the pixel electrodes 26, as well as light-shielding films (a black matrix) 32 at positions corresponding to the scanning electrodes 25A and the signal electrodes 25B. It is well known that the array of the color filters 31 may be a triangular (or delta) array, a mosaic array, a stripe array, etc.

A common electrode 33 is formed on the entire inner surface of the glass substrate 22 so as to cover the color filters 31, and an alignment film 34 is formed on the common electrode 33.

The pixel electrodes 26 and the common electrode 33 are composed of a transparent electrically conductive film (e.g., an ITO film). On the other hand, the scanning electrodes 25A, the signal electrodes 25B and the light-shielding films 32 are opaque films composed of metal or the like. Accordingly, the only areas which can transmit incident light are areas of the pixel electrodes 26 delimited by the scanning electrodes 25A and the signal electrodes 25B (the areas coincide with areas which are not covered with the light-shielding films 32). The areas which can transmit light shall be referred to as apertures. One pixel is an area demarcated by the center lines of the scanning electrodes 25A and the center lines of the signal electrodes 25B (the area coincides with an area demarcated by the center lines of the light-shielding films 32).

The display of an image on the liquid-crystal panel 20 is performed in the following manner.

A scanning voltage is successively applied to the scanning electrodes 25A. As a result of the scanning voltage applied to the scanning electrodes 25A, the switching elements 27 of corresponding pixels are turned on for each scanning. Consequently, the signal electrodes 25B and the pixel electrodes 26 are connected. In each scanning, a voltage equivalent to a video signal representing an image to be displayed is successively applied across the signal electrode 25B and the common electrode 33. Accordingly, a voltage conforming to the video signal is applied across the pixel electrode 26 and the common electrode 33 in each of the pixels.

The liquid crystal 29 within the liquid-crystal panel 20 is aligned in one direction in a state where no voltage is applied across the pixel electrode 26 and the common electrode 33. The direction of the alignment coincides with the direction of polarization of the polarizing plate 23 disposed on the light-incident side. Incident light randomly polarized from the light source 30 is converted into linearly polarized light by the polarizing plate 23. The linearly polarized light passes through the liquid-crystal panel 20 with the direction of polarization thereof preserved. Since the direction of polarization of the polarizing plate 24 on the light-exiting side perpendicularly intersects the direction of polarization of the polarizing plate 23 on the light-incident side, the light which has passed through the liquid-crystal panel 20 does not pass through the polarizing plate 24 on the light-exiting side.

When an appropriate voltage (equivalent to the white level of the video signal) is applied across the pixel electrode 26 and the common electrode 33 of the liquid-crystal panel 20, the direction of alignment of the liquid crystal 29 is rotated through an angle of 90° in helical fashion. When the linearly polarized light resulting from the conversion made by the polarizing plate 23 on the light-incident side passes through the liquid-crystal panel 20, the direction of polarization thereof is rotated through an angle of 90°. Since the 90°-rotated direction of polarization of the light exiting from the liquid-crystal panel 20 coincides with the direction of polarization of the polarizing plate 24 on the light-exiting side, this light is transmitted by the polarizing plate 24.

The rotational angle of the direction of alignment of the liquid crystal 29 is dependent on the voltage applied across the pixel electrode 26 and the common electrode 33 of the liquid-crystal panel 20.

In the scanning of the liquid-crystal panel 20 described above, therefore, the amount of light transmitted varies depending on the voltage corresponding to the video signal applied across the electrodes 26 and 33 for each pixel, and an image represented by the video signal appears by the liquid-crystal panel 20 and the polarizing plates 23 and 24.

Figure 13:
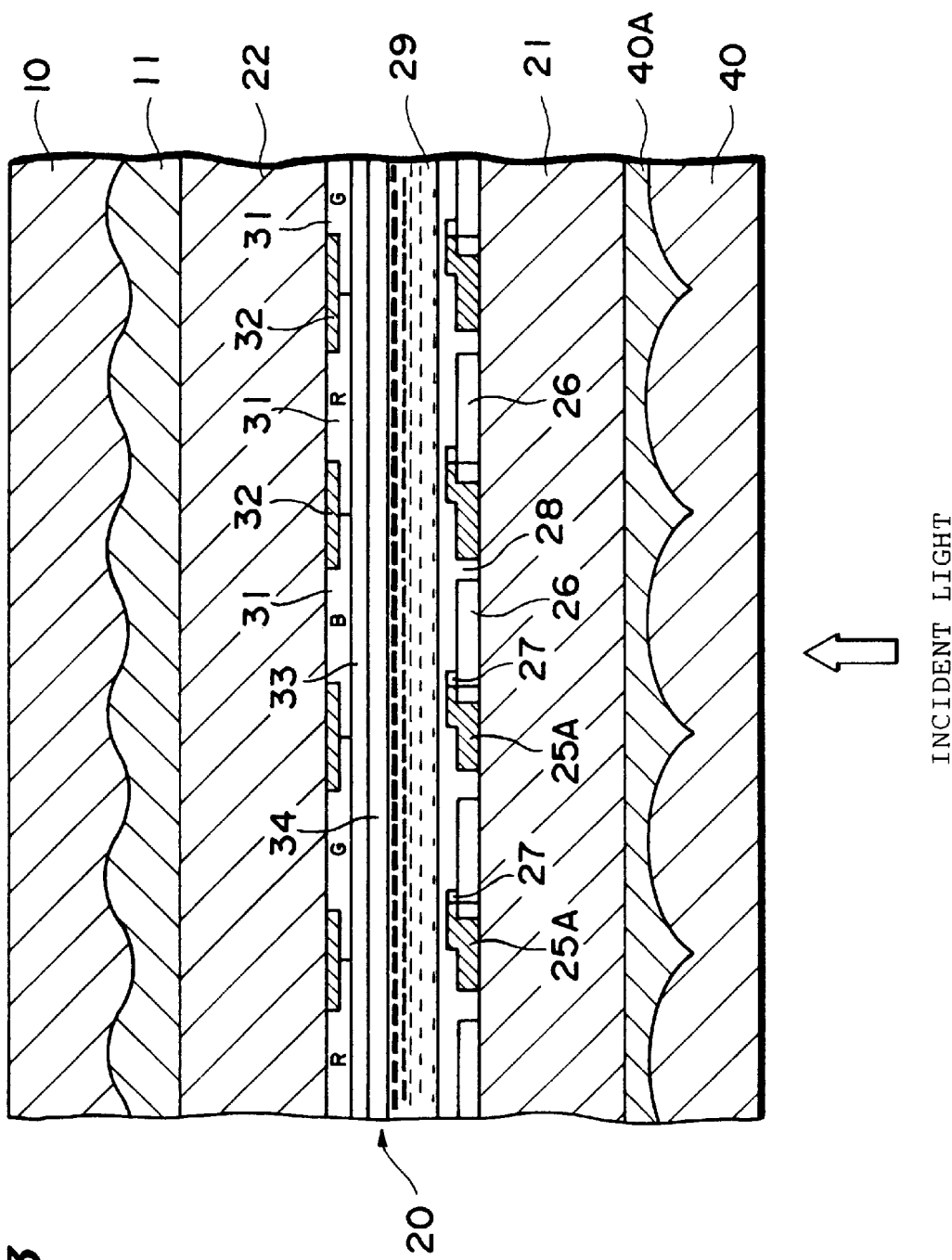
FIG. 13 is an enlarged cross-sectional view showing still another structure of the liquid crystal display device.

In each of the pixels of the liquid-crystal panel 20 described above, the only portion which transmits incident light is the aperture. A microlens array 40 is arranged on the light-incident side of the liquid-crystal panel 20 as shown in FIG. 13 so that as much of the incident light as possible passes through each of the apertures.

The microlens array 40 comprises a substrate and a number of microlenses (convex lenses) arranged in two dimensions on the substrate. The microlenses are respectively arranged at positions corresponding to the apertures of the liquid-crystal panel 20. The microlenses collect light at the corresponding apertures by condensing the incident light. The microlens array 40 is bonded to the glass substrate 21 by a bonding layer 40A. In order to further brighten the liquid-crystal panel, a virtual light source corresponding to each of the microlenses of the microlens array may be constituted by a frustum optical element, as disclosed in Japanese Patent Laid-Open Publication No. 4-366917.

In either case, the optical low-pass filter 10 for allowing the passage of frequency components lower than a spatial frequency defined by the black matrix in the liquid-crystal panel 20 in order to remove sampling noise due to the periodic structure of the black matrix. Generally, the pitch of the optical low-pass filter 10 is smaller than the pitch of the black matrix.

Figure 10:
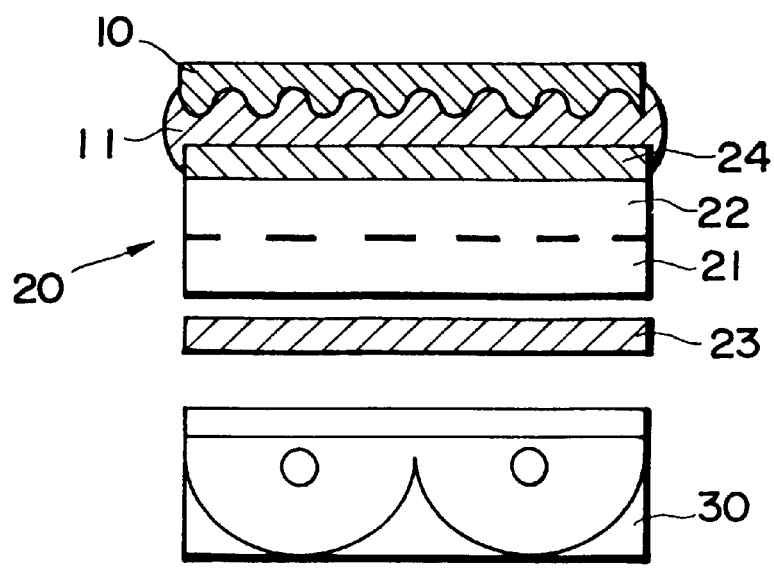
FIG. 10 is a cross-sectional view schematically showing another structure of the liquid crystal display device.

FIG. 10 illustrates another structure of a liquid crystal display device.

The structure of the liquid crystal display device shown in FIG. 10 is the same as the structure shown in FIG. 9 except that a polarizing plate 24 is combined with a glass substrate 22 of a liquid-crystal panel 20 (is held in the bonded or contacted state), and the polarizing plate 24 and an optical low-pass filter 10 are bonded to each other by a bonding layer 11.

Figure 14:
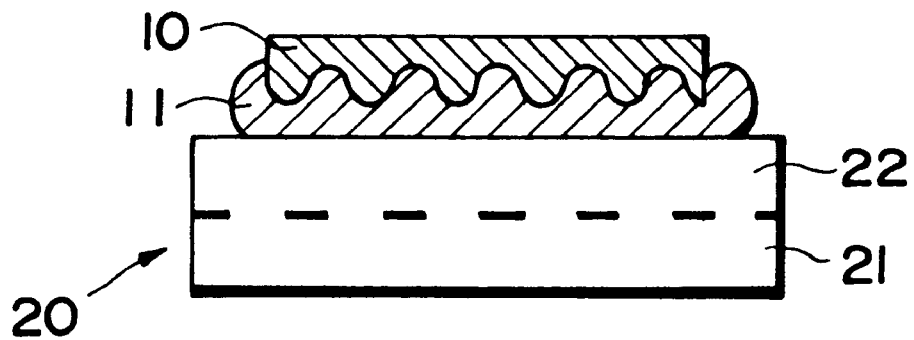
FIG. 14 is a cross-sectional view showing an example in which an optical low-pass filter is provided on a liquid-crystal panel.

FIG. 14 illustrates still another structure of the liquid crystal display device. In FIG. 14, only a liquid-crystal panel and an optical low-pass filter are illustrated.

The external shape of an optical low-pass filter 10 is made smaller than that of a liquid-crystal panel 20. Even if a small amount of a bonding resin 11 for bonding the optical low-pass filter 10 to the liquid-crystal panel 20 sticks out the optical low-pass filter 10, the bonding resin 11 does not protrude beyond the outer side of the liquid-crystal panel 20. Consequently, the bonding work of the optical low-pass filter 10 becomes easy. In addition, not the optical low-pass filter 10 but the liquid-crystal panel 20 may be supported when the display device is assembled, whereby the assembling thereof becomes easy.

It is preferable that the thickness of the optical low-pass filter 10 is made smaller than that of a glass substrate 22 of the liquid-crystal panel 20 (or a polarizing plate 24). This makes it possible to decrease the warping of the liquid-crystal panel based on the difference in thermal expansion coefficients between the optical low-pass filter 10 and the glass substrate 22, for example, and prevent the optical low-pass filter 10 from being peeling off. The resistance to environment is generally improved.

Figure 15:
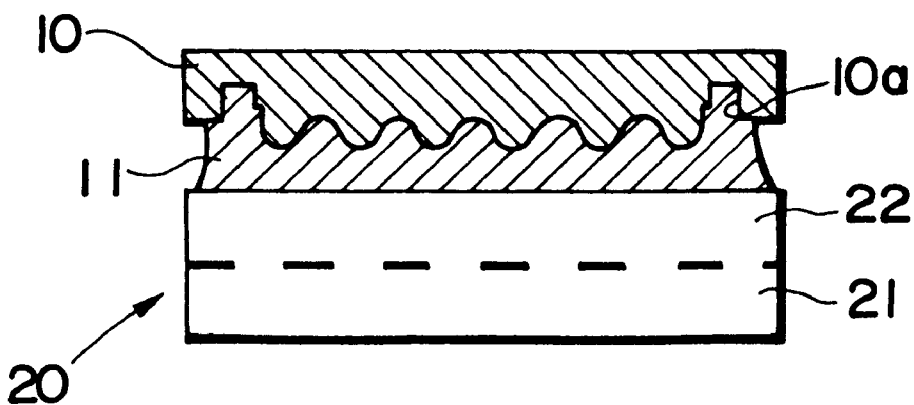
FIG. 15 is a cross-sectional view showing another example in which an optical low-pass filter is provided on a liquid-crystal panel.

FIG. 15 illustrates an example in which a groove 10a is formed in the outer circumferential portion of an optical low-pass filter 10 on the bonding surface side thereof. It is preferable that the groove 10a is continuous along the entire perimeter of the optical low-pass filter 10. The formation of the groove 10a makes it possible to prevent a bonding resin 11 from protruding to the exterior even if the size of the optical low-pass filter 10 is the same as that of a liquid-crystal panel 20.

Figure 16:
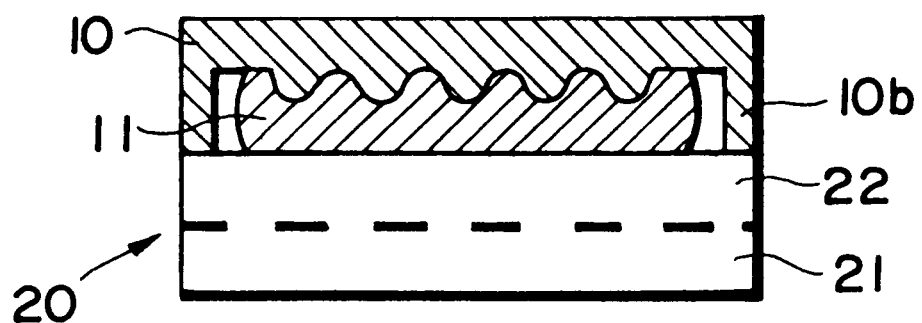
FIGS. 16 and 17 are cross-sectional views showing still other examples in which an optical low-pass filter is provided on an liquid-crystal panel.

FIG. 16 illustrates an example in which a projected wall 10b is formed on the outer circumference of an optical low-pass filter 10 on the bonding surface side thereof. The projected wall 10b may be provided along the entire perimeter of the optical low-pass filter 10, or a portion thereof may be cut away. The height of the projected wall 10 is equal at all locations, thereby to make it possible to make the gap between the optical low-pass filter 10 and a liquid-crystal panel 20 (a glass substrate 22) equal irrespective of the locations to keep the optical low-pass filter 10 and the liquid-crystal panel 20 parallel to each other. Further, it is possible to prevent a bonding resin 11 from protruding to the outside.

Figure 17:
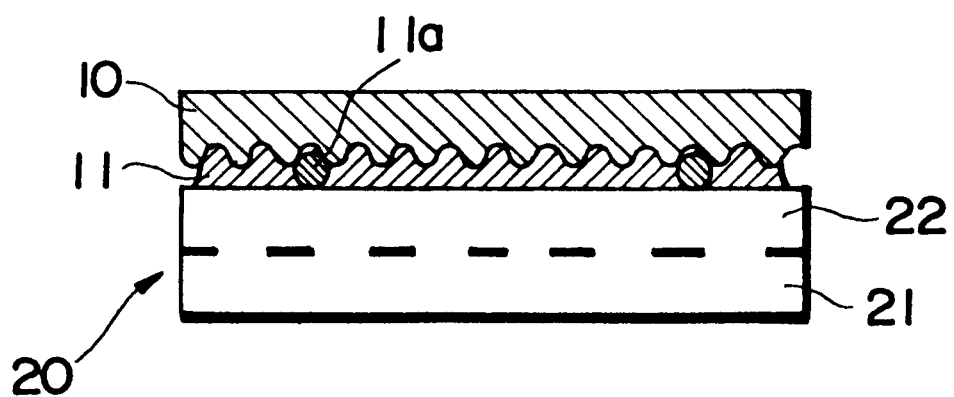

FIG. 17 illustrates an example in which a spacer 11a is provided between an optical low-pass filter 10 and a glass substrate 22 of a liquid-crystal panel 20. This structure makes it possible to keep the optical low-pass filter 10 and the glass substrate 22 parallel to each other.

The refractive index of a bonding layer 11 and the refractive index of the spacer 11a must be equal or approximately equal. For example, when a ball lens K-3 (or a cylindrical lens; both are made of glass and have a refractive index of 1.52) manufactured by Nippon Denki Garasu Corporation is used as the spacer 11a, a UV-setting resin LE-3629 (the refractive index of which is 1.52) manufactured by Toyo Ink Mfg. Co., Ltd. may be used as the bonding resin 11. Generally, bonding resins having various refractive indexes are available, thereby to make it possible to select a bonding resin having a refractive index suitable for the refractive index of a spacer. The optical low-pass filter 10 is fabricated by injection molding using PC (the refractive index of which is 1.584), for example.

As described in the foregoing, the optical low-pass filter is bonded to the glass substrate of the liquid-crystal panel or the polarizing plate using the bonding resin, thereby to make it possible to integrate the optical low-pass filter with the member constituting the liquid crystal display device. Consequently, it is possible to miniaturize the liquid crystal display device and reduce the number of components thereof. In addition, the number of operations such as an adjustment in the assembling processes can be reduced, whereby high yield can be expected.

Furthermore, no dust, foreign matter or the like adheres to a space between the optical low-pass filter and the member (the component) constituting the display device, so that the optical low-pass filter and the member constituting the display device (the glass substrate or the polarizing plate) can be kept parallel to each other, thereby to make it possible to prevent the occurrence of rainbow-shaped interference fringes.

Additionally, a surface defined by projections and depressions of the optical low-pass filter can be covered with a bonding layer, thereby to make it possible to prevent dust from adhering on the surface defined by projections and depressions as well as not to damage the surface defined by projections and depressions at the time of assembling, for example.

FIG. 18 illustrates one example of the processes of mounting an optical low-pass filter on a liquid-crystal panel.

Figure 18A:
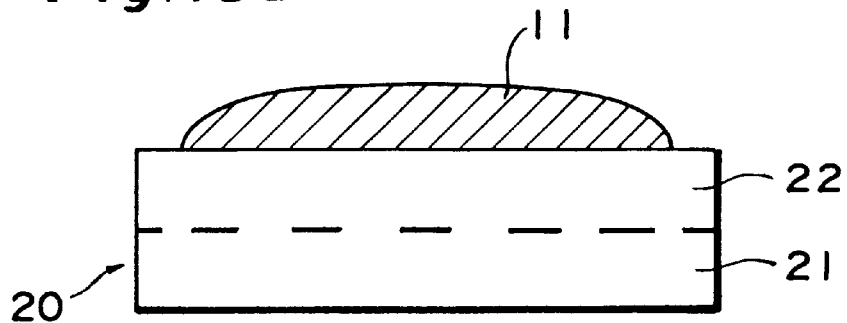
FIGS. 18a to 18c show the mounting processes of an optical low-pass filter.

A UV-setting resin 11 is dropped on a glass substrate 22 of a liquid-crystal panel 20 (see FIG. 18a).

Figure 18B:
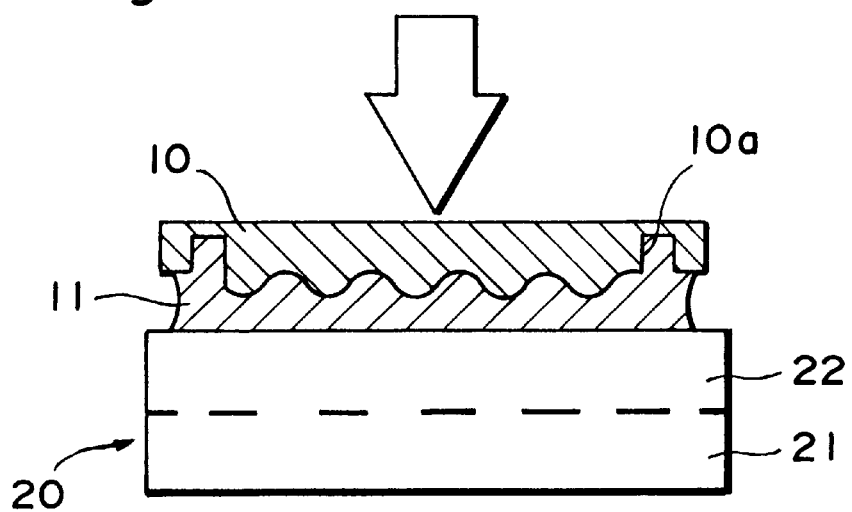

An optical low-pass filter 10 having a groove 10a on its outer circumference is put on the resin 11 with its surface patterned by many projections and depressions directed toward the resin 11, and the optical low-pass filter 10 is pressed against the glass substrate 22 while keeping the optical low-pass filter 10 parallel to the glass substrate 22 (see FIG. 18b).

Figure 18C:
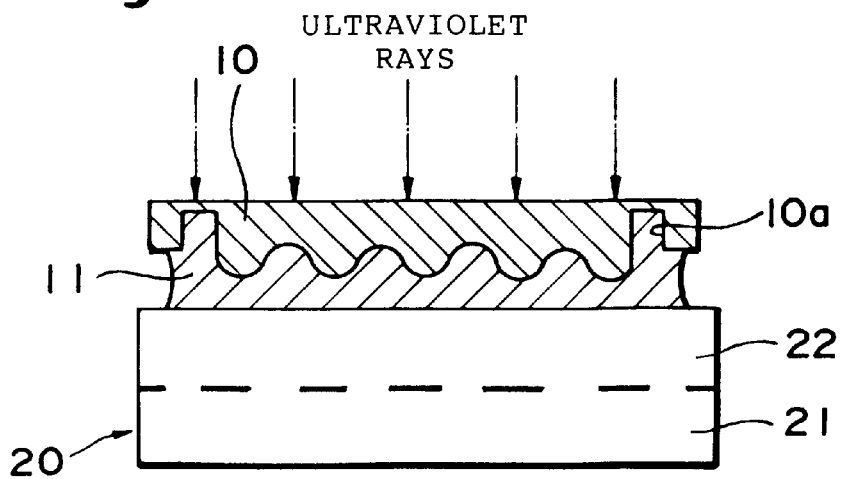

Ultraviolet rays are irradiated through the optical low-pass filter 10, to solidify the resin 11 (see FIG. 18c).

When the optical low-pass filter having the groove 10a formed therein is thus used, the resin 11 does not protrude to the outside, thereby to make the mounting processes easy. It goes without saying that an optical low-pass filter having no groove can be used. Unless the bonding resin protrudes beyond the liquid-crystal panel, the liquid-crystal panel can be fixed to a frame of a display device using a side surface (an end face) of the liquid-crystal panel as described above, thereby to make the assembling easy.

Figure 19:
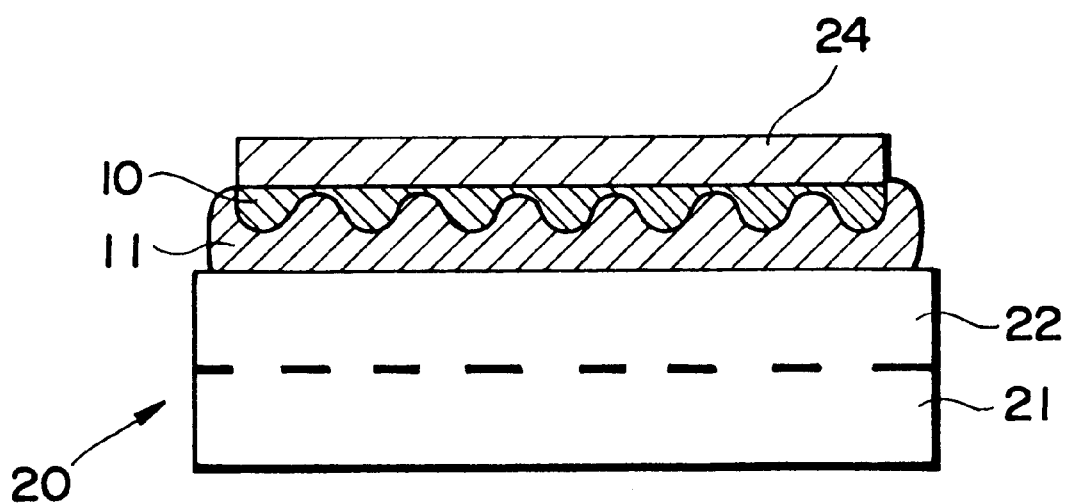
FIG. 19 is a cross-sectional view showing an optical low-pass filter formed on a polarizing plate.

FIG. 19 illustrates an example in which a polarizing plate 24 is used as a substrate, and an optical low-pass filter 10 is formed on the substrate using a UV-setting resin 11. Specifically, a space between a stamper of the optical low-pass filter and the polarizing plate 24 is filled with the UV-setting resin 11, and ultraviolet rays are irradiated, to solidify the resin. Thereafter, when the stamper is removed, the optical low-pass filter 10 is integrated with the polarizing plate 24.

A space between the optical low-pass filter 10 and a glass substrate 22 of a liquid-crystal panel 20 is filled with the UV-setting resin 11, to solidify the resin 11 by the method shown in FIG. 18.

As a material of the optical low-pass filter 10 and a material of the bonding resin, UV-setting resins having different refractive indexes are used. UV-setting resins having various refractive indexes are commercially available. Representatives of the UV-setting resins include LE-3629 (the refractive index n=1.52) manufactured by Toyo Ink Mfg. Co., Ltd., GRANDIC RC SERIES (the refractive index n=1.52 to 1.53) and DEFENSA HNA-101 (the refractive index n=1.37) both manufactured by Dainippon Ink & Chemicals, Inc..

In the above described all embodiments, it goes without saying that the top of a projection in a pattern of projections and depressions of the optical low-pass filter may be brought into contact with the glass substrate of the liquid-crystal panel or the polarizing plate.

High yield can be expected when a UV-setting resin is used as a bonding resin.

Description is now made of the fact that fabrication precision in a case where the optical low-pass filter is bonded to the member constituting the display device through the bonding layer (case 1) is equivalently improved, as compared with that in a case where there is an air layer between the optical low-pass filter and the member constituting the display device (case 2) (Also in either case, the pattern of projections and depressions of the optical low-pass filter is opposed to the member constituting the display device).

Light incident on the optical low-pass filter is generally diffracted by the optical low-pass filter, whereby 0-th order light, 1-th order diffracted light and higher order diffracted light appear. The number of formed beams of the 1-th order diffracted light is eight. In the case of a sinusoidal wave-shaped optical low-pass filter whose grating is in a sinusoidal wave shape, light intensities of the 1-th order diffracted light beams become equal.

$P_0$ and $P_1$ are respectively taken as the light intensity of the 0-th order light and the light intensity of the 1-th order diffracted light.

The ratio of the 1-th order diffracted light to the 0-th order light (hereinafter referred to as the split ratio) $P_1/P_0$ is an important factor in considering the characteristics of the optical low-pass filter. It shall be desirable that the split ratio is 1 or in the vicinity of 1.

The light intensities $P_0$ and $P_1$ of the 0-th order light and the 1-th order diffracted light are respectively indicated by the following Equations (1) and (2):

$$P_0=|J_0\ (\phi/2)|^2 \qquad (1)$$

$$P_1=|J_1\ (\phi/2)|^2 \qquad (2)$$

$J_0$ and $J_1$ are respectively Bessel functions. In addition, $\phi$ is the phase shift (the phase difference between light passing through the crest of the grating and light passing through the trough thereof).

In the case of a sinusoidal wave-shaped optical low-pass filter having the best optical low-pass filtering characteristics, the phase shift $\phi$ is given by the following Equation (3):

$$\phi=d\times|(n_1-n_2)|\times(2\pi/\lambda) \qquad (3)$$

In the foregoing Equation (3), d is the thickness of the grating (the grating thickness), and $n_1$ is the refractive index of a material of the optical low-pass filter, $n_2$ is the refractive index of a material of the bonding layer (a case where the optical low-pass filter is bonded to the member constituting the display device by the bonding layer; a case 1) or the refractive index of air ($n_2=1$) (a case where a surface defined by projections and depressions of the optical low-pass filter is brought into contact with air; a case 2), and $\lambda$ is the wavelength of incident light.

The foregoing Equation (3) indicates that the refractive index $n_1$ of the optical low-pass filter and the refractive index $n_2$ of the bonding layer should differ from each other.

The following two types of bonding resins 1 and 2 (both are UV-setting resins) are used as the above described case 1:

Bonding resin 1: DEFENSA HNA-101 manufactured by Dainippon Ink & Chemicals, Inc. $n_2=1.37$ Bonding resin 2: UV-040 manufactured by Sanyo Kasei Kogyo Co., Ltd. $n_2=1.57$ The grating thickness d calculated using the Equations (1) to (3) is as follows (the wavelength of incident light $\lambda=587.6$ nm, and $n_1=1.491$).

Case 1 (Bonding resin 1)

When the split ratio is 0.9, 1.0 and 1.1, the grating thicknesses d are respectively 2.00 $\mu$m, 2.06 $\mu$m and 2.11 $\mu$m.

Case 1 (Bonding resin 2)

When the split ratio is 0.9, 1.0 and 1.1 the grating thicknesses d are respectively 3.06 $\mu$m, 3.15 $\mu$m and 3.23 $\mu$m.

Case 2 (no bonding resin, in the case of air ; $n_2=1$)

When the split ratio is 0.9, 1.0 and 1.1, the grating thicknesses d are respectively 0.49 $\mu$m, 0.51 $\mu$m and 0.52 $\mu$m.

The foregoing shows that the fabrication precision of the grating thickness is significantly eased when the bonding layer is used. The same is true for the following embodiment, that is, examples in which the bonding layer is replaced with a pressure sensitive adhesive layer (referred to as "adhesive layer" hereinafter).

Figure 20:
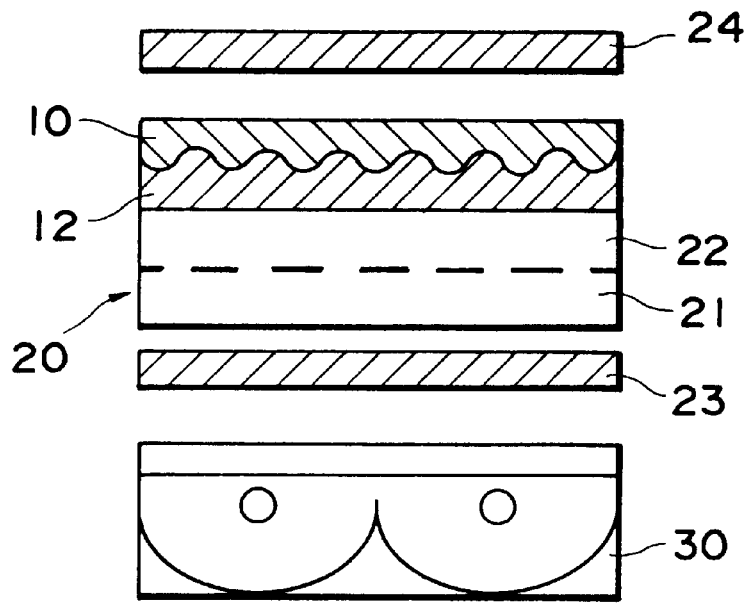
FIG. 20 is a cross-sectional view showing an example in which an optical low-pass filter is provided on a liquid-crystal panel through an adhesive layer.

FIG. 20 illustrates an example in which the bonding layer is replaced with an adhesive layer 12, to combine an optical low-pass filter 10 and a glass substrate 22 of a liquid-crystal panel 20 with each other, which corresponds to the structure shown in FIG. 9.

Figure 21:
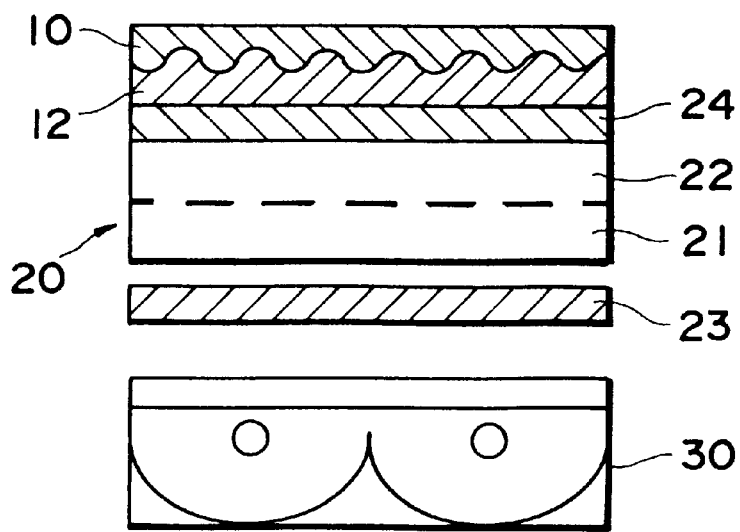
FIG. 21 is a cross-sectional view showing another example in which an optical low-pass filter is provided on a liquid-crystal panel through an adhesive layer.

FIG. 21 shows the structure corresponding to that shown in FIG. 10, in which the bonding layer is replaced with an adhesive layer 12.

Figure 22:
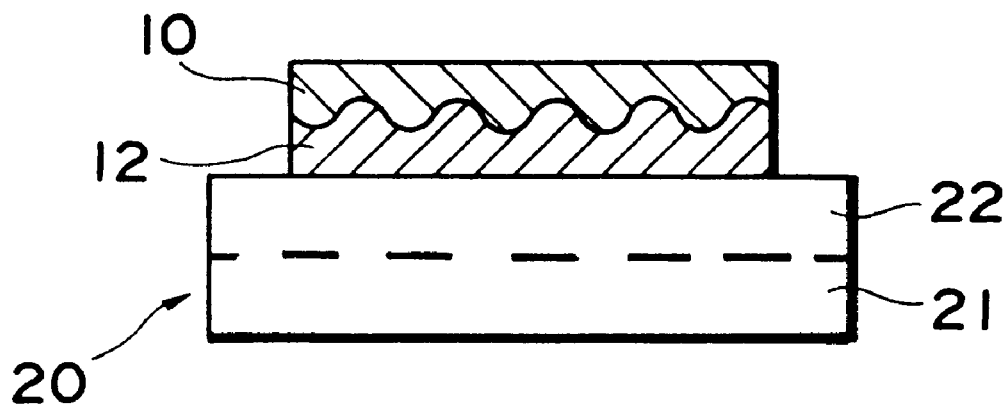
FIGS. 22 and 23 are cross-sectional views showing still other examples in which an optical low-pass filter is provided on a liquid-crystal panel through an adhesive layer.

FIG. 22 corresponds to FIG. 14, in which the size of an optical low-pass filter 10 is smaller than that of a liquid-crystal panel 20, and the bonding layer is replaced with an adhesive layer 12.

Figure 23:
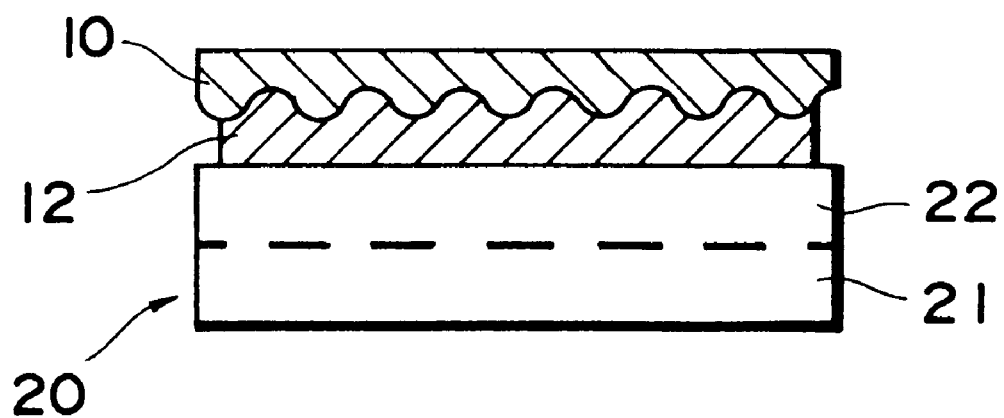

FIG. 23 illustrates an example in which the size of an adhesive layer 12 is so made small as not to protrude beyond a liquid-crystal panel 20.

The adhesive layer 12 is composed of pressure sensitive adhesives (hereinafter referred to as adhesives) or an adhesive resin. Examples thereof include an acrylic resin and a rubber-based adhesive resin. Concrete examples of the adhesives include pressure sensitive adhesive double coated tapes NO. 532 and NO. 5915 (the refractive index of which is 1.487) manufactured by Nitto Denko Corporation. The adhesive layer 12 can be also formed by affixing the pressure sensitive adhesive double coated tape (adhesives mainly composed of butylacrylate) to an optical low-pass filter, a glass substrate or a polarizing plate.

The refractive index of the adhesive layer 12 must be different from the refractive index of the optical low-pass filter.

It can be considered that the adhesive layer (the adhesives or the adhesive resin) is one type of the bonding layer (the bonding agents or the bonding resin).

Figure 24:
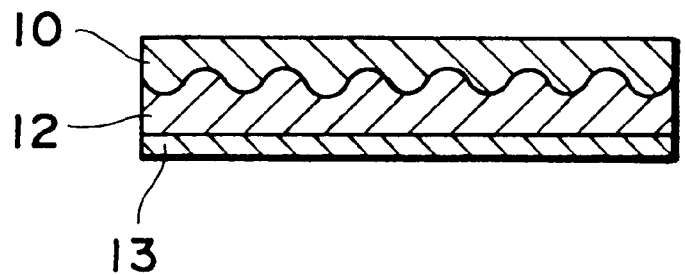
FIG. 24 is a cross-sectional view showing an optical low-pass filter.

FIG. 24 illustrates an article of manufacture in which an adhesive layer 12 is formed on an optical low-pass filter 10. The surface of the adhesive layer 12 is covered with a separator 13. Such an optical low-pass filter product is very convenient because the separator 13 can be stripped and the optical low-pass filter can be affixed to a glass substrate of a liquid-crystal panel or a polarizing plate.

An adhesive layer is formed on not only a surface patterned by many projections and depressions (a surface having an optical function) of the optical low-pass filter 10 but also a flat surface on the opposite side thereof, and separators are affixed to the adhesive layers, thereby to make it possible to easily fabricate a display device as described below.

Figure 25:
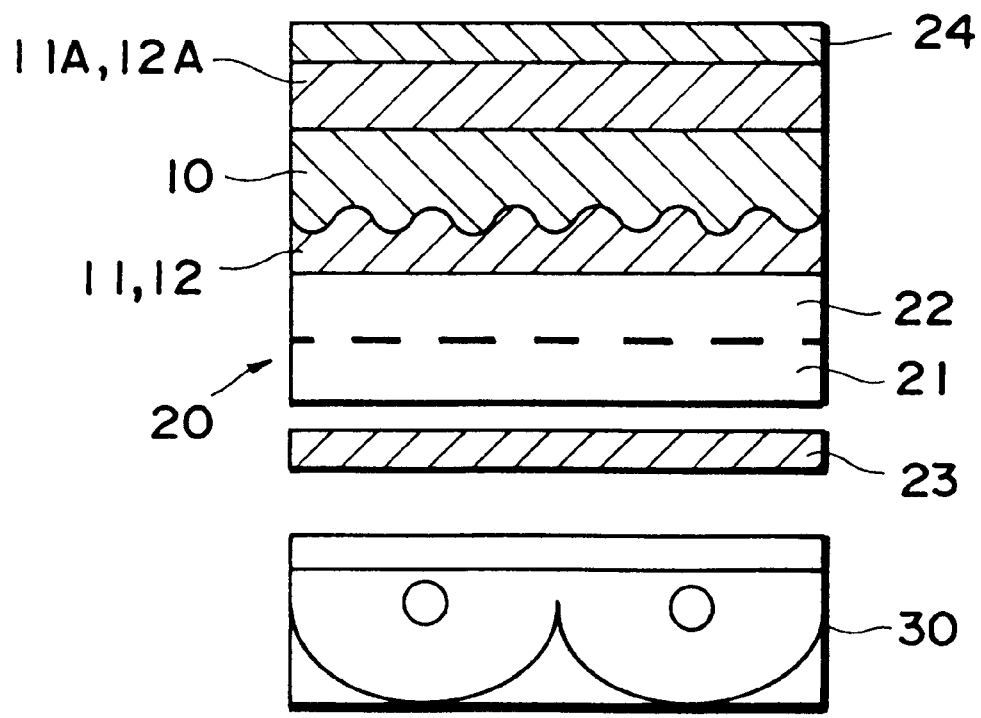
FIG. 25 is a cross-sectional view showing a liquid crystal display device having an optical low-pass filter.

In FIG. 25, an optical low-pass filter 10 is fixed to a glass substrate 22 of a liquid-crystal panel 20 by a bonding layer 11 or an adhesive layer 12. A polarizing plate 24 is fixed to a flat surface, on which a pattern of projections and depressions is not formed, of the optical low-pass filter 10 through a bonding layer 11A or an adhesive layer 12A. Consequently, the polarizing plate 24, the optical low-pass filter 10 and the liquid-crystal panel 20 are integrated.

Preferably, the refractive index of the bonding layer 11 or the adhesive layer 12 and the refractive index of the glass substrate 22 may be made equal or approximately equal. Consequently, it is possible to reduce Fresnel reflection occurring in the interface between the bonding layer 11 or the adhesive layer 12 and the glass substrate 22. For example, it is assumed that the refractive index of the glass substrate (Coning 7059) 22 is 1.52. In this case, an epoxy resin (the refractive index of which is 1.46 to 1.54) may be used as the bonding layer 11.

Similarly, the refractive index of the optical low-pass filter 10 and the refractive index of the bonding layer 11A or the adhesive layer 12A are made equal or approximately equal, thereby to make it possible to reduce Fresnel reflection occurring in the interface between the optical low-pass filter 10 and the bonding layer 11A or the adhesive layer 12A. For example, when the optical low-pass filter 10 is composed of PMMA (the refractive index of which is 1.491), an epoxy resin (the refractive index of which is 1.46 to 1.54) can be used as the bonding layer 11A or a pressure sensitive adhesive double coated tape NO. 532 (the refractive index of which is 1.487) manufactured by Nitto Denko Corporation can be used as the adhesive layer 12A.

Figure 26:
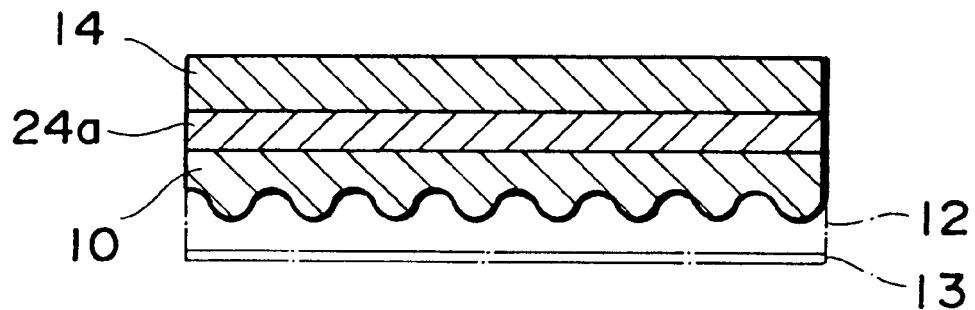
FIGS. 26 and 27 are cross-sectional views showing an optical low-pass filter formed on a polarizing plate.
Figure 27:
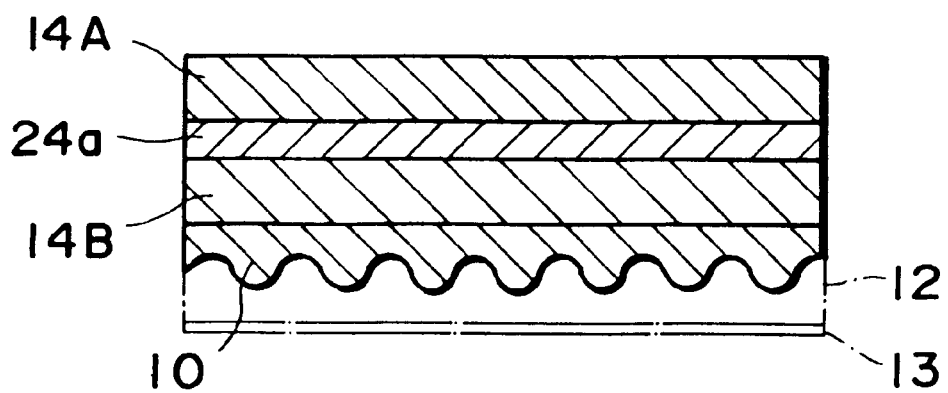

FIGS. 26 and 27 illustrate examples of a polarizing plate having an optical low-pass filter. In the structure shown in FIG. 19, the optical low-pass filter 10 is formed on the polarizing plate 24 by a UV-setting resin using a stamper and is integrated with the polarizing plate 24. Similarly, an optical low-pass filter is integrally formed on a polarizing plate, thereby to make the handling and the assembling easy.

In FIG. 26, protective layers (the upper protective layer is indicated by reference numeral 14) are formed on both surfaces of a polarizer 24a. The protective layers are layers or films composed of triacetyl cellulose (TAC), for example. The lower protective layer is embossed using such a pattern that projections and depressions of the sinusoidal wave-shaped low-pass filter are reversed, thereby to form the optical low-pass filter 10.

In FIG. 27, protective layers 14A and 14B composed of TAC are formed on both surfaces of a polarizer 24a (sheet-forming or rolling). An optical low-pass filter 10 is formed on the one protective layer 14B by a UV-setting resin using a stamper.

Figure 28:
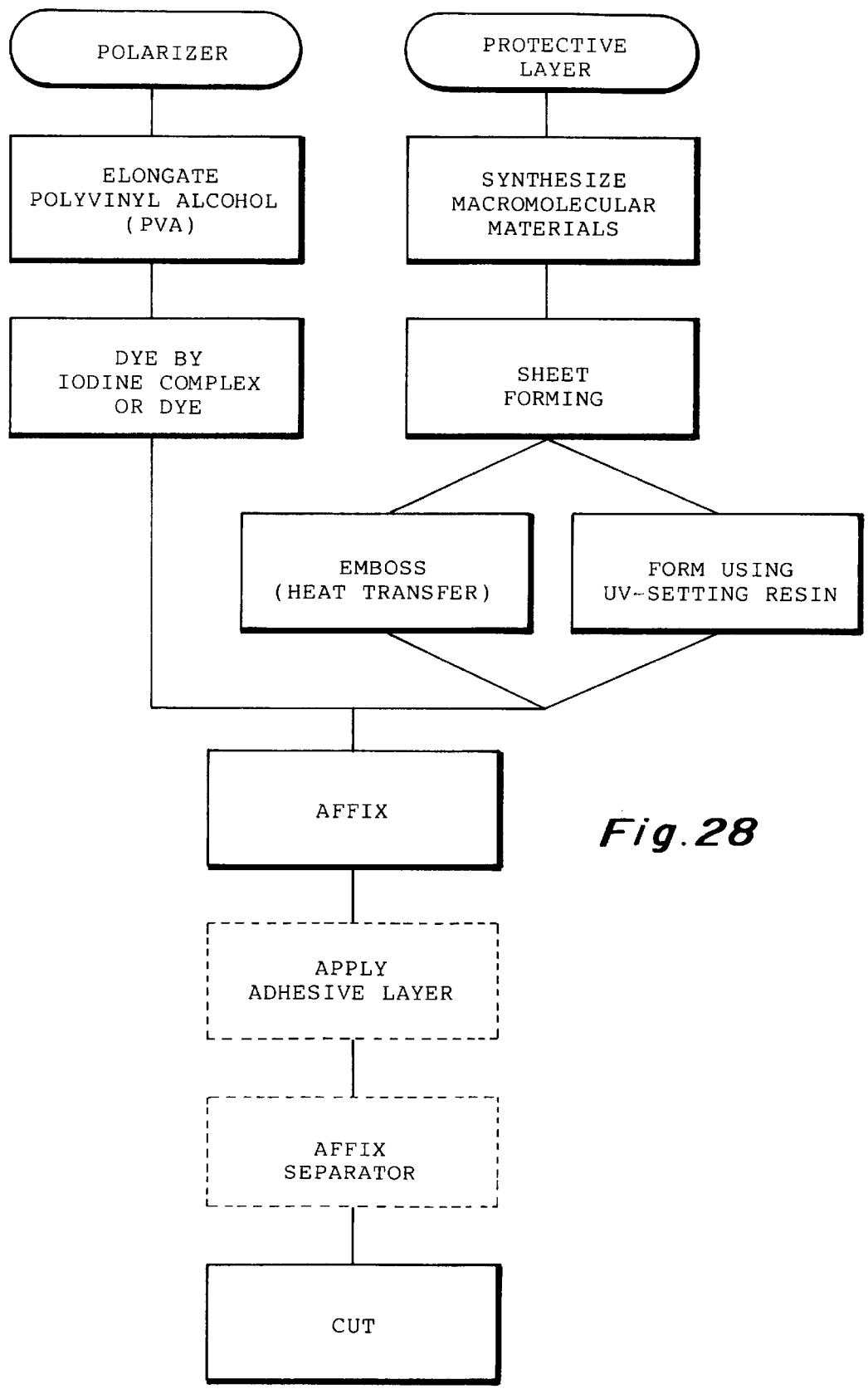
FIG. 28 is a flow chart showing the fabricating processes of a polarizing plate on which an optical low-pass filter is integrally formed.

FIG. 28 shows the fabricating processes of a polarizing plate with an optical low-pass filter as shown in FIGS. 26 and 27.

The polarizer 24a itself is fabricated by adsorbing an iodine complex or a dye to uniaxially elongated polyvinyl alcohol (PVA).

As the protective film (layer), TAC, polyester, acrylic, etc. are generally used. TAC is generally used because it is superior in resistance to environment (ultraviolet transmission characteristics, moisture resistance, or the like). Such macromolecular materials are synthesized, and are subjected to sheet forming.

The optical low-pass filter 10 shown in FIG. 26 is fabricated by heating a sheet of the protective layer and pressing a stamper (having a pattern of projections and depressions exhibiting two-dimensional sinusoidal waveforms) against the sheet (embossing).

The optical low-pass filter 10 shown in FIG. 27 is fabricated by using a sheet of the protective layer 14B as a substrate and filling a space between the substrate and a stamper (having a pattern of projections and depressions exhibiting two-dimensional sinusoidal waveforms) with a UV-setting resin, then irradiating ultraviolet rays to solidify the resin, and finally removing the stamper.

The polarizer 24a, the optical low-pass filter 10 used as the protective layer (FIG. 26) fabricated by embossing or the optical low-pass filter 10 composed of a UV-setting resin and integrated with the protective layer 14B (FIG. 27), and the other protective layer 14 (FIG. 26) or 14A (FIG. 27) are affixed with the polarizer 24a interposed therebetween and are cut to suitable sizes. Consequently, a polarizing plate with the optical low-pass filter shown in FIG. 26 or 27 is completed.

In the structures respectively shown in FIGS. 26 and 27, a polarizing plate product with an optical low-pass filter (or an optical low-pass filter product with a polarizing plate) is obtained by forming an adhesive layer 12 on the optical low-pass filter 10 on the side of a surface defined by projections and depressions thereof, and providing a separator 13 on the surface of the adhesive layer 12, as indicated by one-dot and dash lines. This product is also suitably used in order to make it easy to assemble a liquid crystal display device.

A polarizing plate is generally constructed by bonding protective layers to both surfaces of a polarizer. It should be understood that the polarizing plates 23 and 24 shown in FIGS. 9, 10, 19, 20, 21 and 25 and figures as described later include such a polarizing plate.

Figure 29:
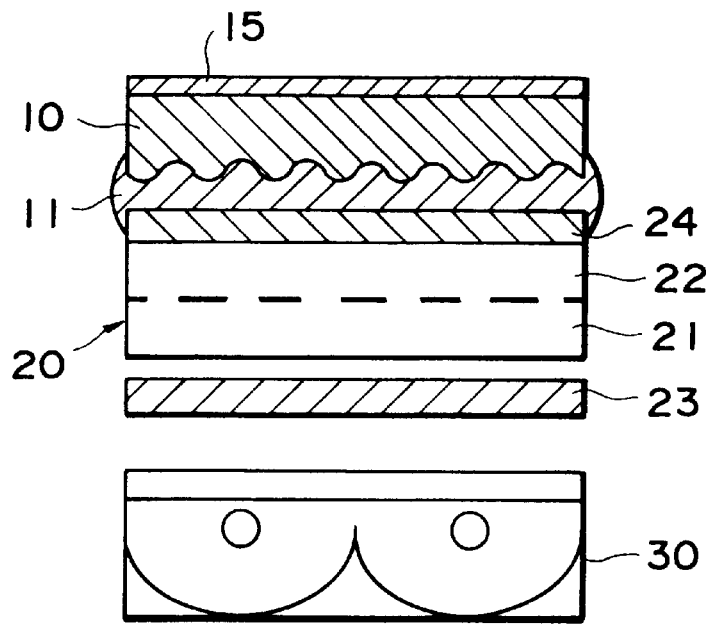
FIGS. 29 and 30 are cross-sectional views showing a liquid crystal display device on which an anti-reflection film is formed.
Figure 30:
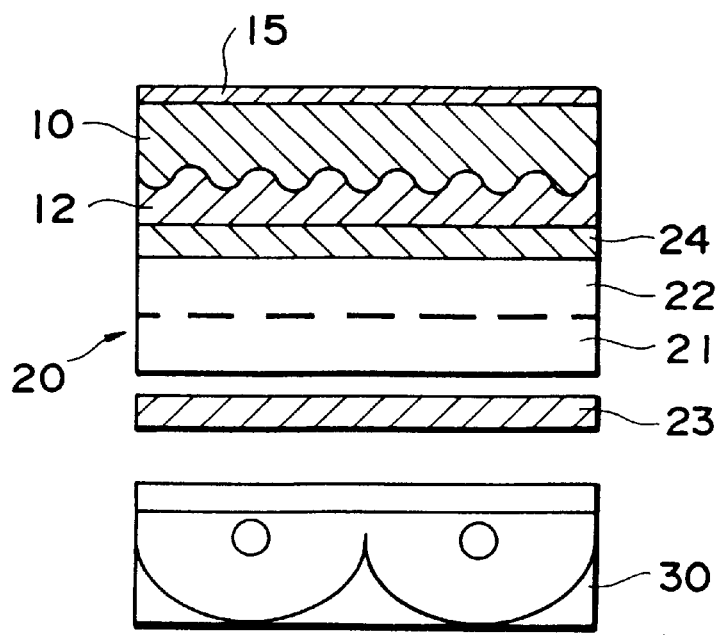

FIGS. 29 and 30 illustrate an example in which an anti-reflection film (AR Coating, Anti-Reflection) is provided. FIG. 29 illustrates a structure using the bonding layer 11 shown in FIG. 10, and FIG. 30 illustrates a structure using the adhesive layer 12 shown in FIG. 21. An anti-reflection film 15 is formed on an outside flat surface of an optical low-pass filter 10. In the structures shown in FIGS. 9 and 20, an anti-reflection film can be also formed on the outer surface of the polarizing plate 24. Since the amount of reflection of external light is reduced by the anti-reflection film, a display screen becomes easy to see. This is effective when it is utilized for a liquid crystal television, for example. The anti-reflection film is formed on a surface on the side of a viewer, that is, the outermost surface of a display device.

The anti-reflection film 15 is realized by a dielectric film (an evaporated film), an organic film, or the like. Examples of the dielectric film include a magnesium fluoride ($MgF_2$) film (the refractive index of which is 1.38), zirconia ($ZrO_2$), and sapphire ($Al_2O_3$). They are formed by vacuum evaporation. Examples of the organic film include SAITOP (a fluorine resin) (the refractive index of which is 1.34) manufactured by Asahi Glass Co., Ltd.

The anti-reflection film 15 has a lower refractive index than the refractive index of a substrate (the optical low-pass filter 10 in the examples shown in FIGS. 29 and 30, or the polarizing plate in the examples shown in FIGS. 9 and 20) on which the anti-reflection film 15 is formed.

Figure 31:
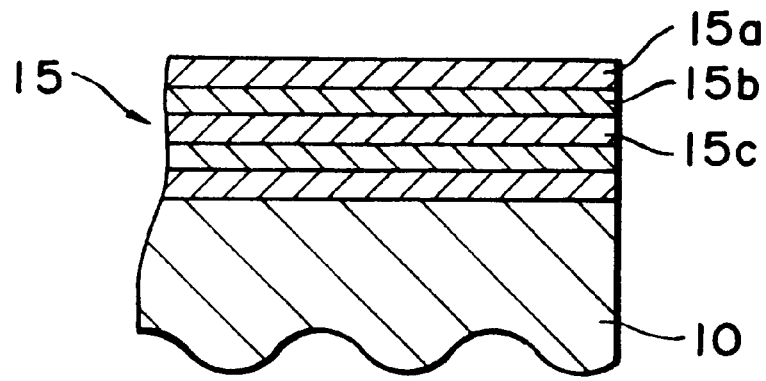
FIG. 31 is a cross-sectional view showing a multilayer anti-reflection film in an enlarged manner.

The anti-reflection film 15 can be constituted by multi-layer film 15a, 15b, 15c, . . . as shown in FIG. 31. Consequently, the reflectivity of the anti-reflection film 15 is significantly reduced.

Figure 32:
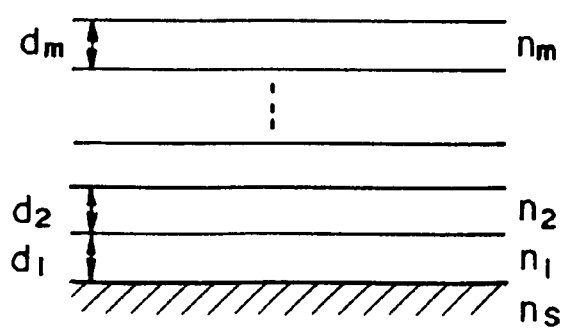
FIG. 32 is a diagram for explaining the function of the multilayer anti-reflection film.

As shown in FIG. 32, m-layer thin films (an anti-reflection film) respectively having refractive indexes $n_1, n_2, \ldots, n_m$ shall be formed on a substrate having a refractive index $n_s$. The thicknesses of the thin films are respectively taken as $d_1, d_2, \ldots, d_m$.

The reflectivity R of such multilayer films is given by the following equation:

$$R = \frac{(m_{11} - n_s m_{22})^2 + (n_s m_{12} - m_{21})^2}{(m_{11} + n_s m_{22})^2 + (n_s m_{12} + m_{21})^2} \qquad \text{Eq. (4)}$$

It is desirable that the reflectivity R is close to zero.

$m_{11}, m_{22}, m_{12}$ and $m_{21}$ in the foregoing Equation (4) can be found using the following characteristic matrix M:

$$M = M_m \cdot M_{m-1} \cdot \ldots \cdot M_2 \cdot M_1 \qquad \text{Eq. (5)}$$

$$= \begin{pmatrix} m_{11} & im_{12} \\ im_{21} & m_{22} \end{pmatrix}$$

$$M_m = \begin{pmatrix} \cos\delta & \frac{i}{n_m} \cdot \sin\delta \\ in_m \cdot \sin\delta & \cos\delta \end{pmatrix} \qquad \text{Eq. (6)}$$

$$\delta = 2\pi n_m d_m / \lambda \qquad \text{Eq. (7)}$$

In the foregoing Equation (7), $\lambda$ is the wavelength of incident light.

When an optical low-pass filter is composed of PMMA (the refractive index $n_s=1.491$), the reflectivity of the optical low-pass filter is as follows (when no anti-reflection film is formed) ($\lambda=587.6$ nm):

$$R = \left(\frac{1 - 1.491}{1 + 1.491}\right)^2 = 3.9(\%) \qquad \text{Eq. (8)}$$

The reflectivity of the optical low-pass filter in a case where a single-layer anti-reflection film composed of magnesium fluoride $MgF_2$ ($n_1=1.38$) is formed on a flat surface of the optical low-pass filter is calculated as follows from the foregoing Equations (4) to (7), where $d_1=\lambda/4$ (cos $\delta=0$ holds) ($\lambda=587.6$ nm):

$$R = \left(\frac{1.491 - 1.38}{1.491 + 1.38}\right)^2 = 1.5(\%) \qquad \text{Eq. (9)}$$

It is found that the reflectivity is reduced.

The following is the result of the calculation of the reflectivity of the optical low-pass filter in a case where a three-layer anti-reflection film is formed on the optical low-pass filter. The first layer is sapphire ($Al_2O_3$) ($n_1=1.62$, $d_1=\lambda/4$), the second layer is zirconia ($ZrO_2$) ($n_2=2.0$, $d_2=\lambda/2$), and the third layer is magnesium fluoride ($MgF_2$) ($n_3=1.38$, $d_3=\lambda/4$) ($\lambda=587.6$ nm).

$$R = \frac{(1.62^2 - 1.491 \times 1.38^2)^2}{(1.62^2 + 1.491 \times 1.38^2)^2} = 0.155(\%) \qquad \text{Eq. (10)}$$

It is found that the reflectivity is very low. Such a multilayer anti-reflection film can be fabricated by vacuum evaporation or the like.

Figure 33:
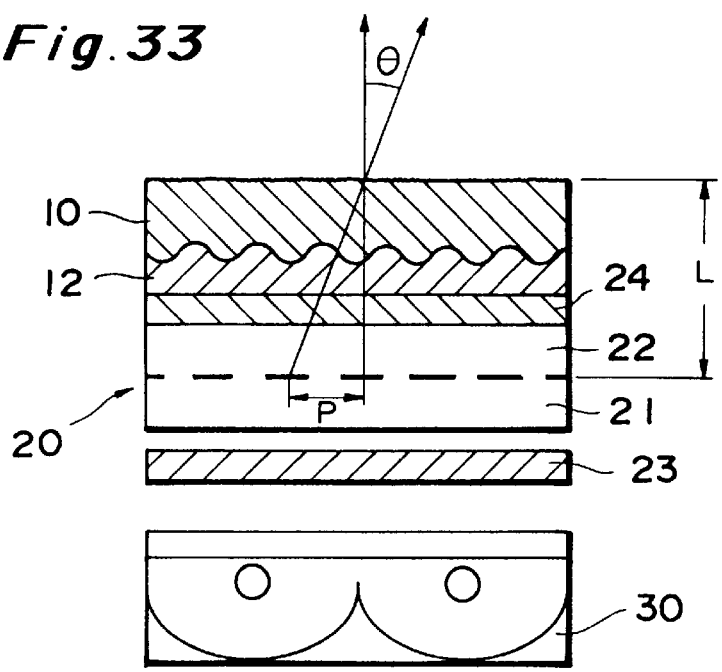
FIGS. 33 and 34 are cross-sectional views showing a liquid crystal display device which is subjected to anti-glare processing.
Figure 34:
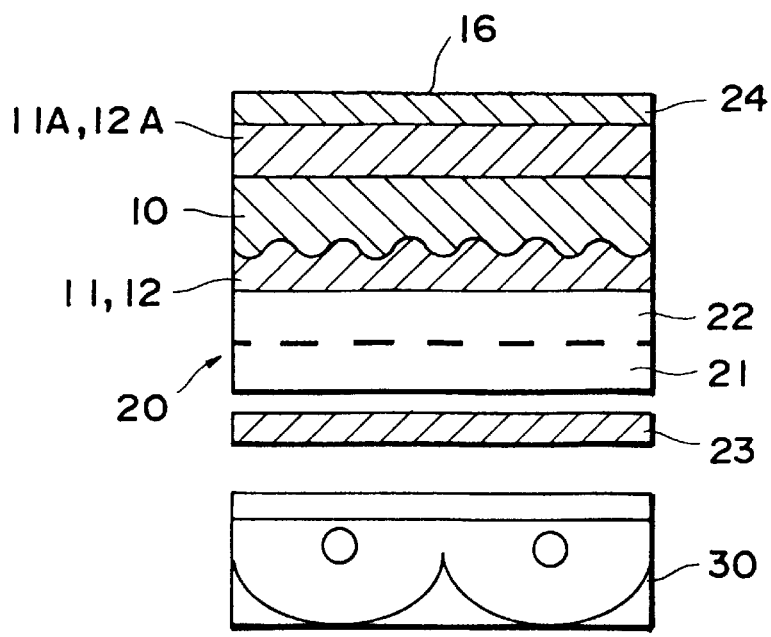

FIGS. 33 and 34 illustrate examples in which the outer surface of an optical low-pass filter 10 is subjected to anti-glare processing (or non-glare processing) 16 instead of forming the anti-reflection film 15. FIGS. 33 and 34 respectively correspond to FIGS. 29 and 30. It goes without saying that the outer surface of the polarizing plate 24 may be subjected to anti-glare processing in the structures shown in FIGS. 9 and 20.

The anti-glare processing is processing for subjecting the surface of a substrate to etching or sand-blast processing to roughen the surface. When disturbing light is obliquely incident on the surface of a flat substrate, a display screen or the like (the surface of a display device) and is regularly reflected, a displayed image becomes difficult to see (for example, when light of a ceiling lamp or a fluorescent lamp is incident on the display screen, an image of the fluorescent lamp is reflected on the display screen, whereby the display screen is difficult to see). If the surface of the display screen is subjected to anti-glare processing, the disturbing light incident on the surface of the display screen is scattered, whereby an image produced by the disturbing light does not appear.

If the surface of the substrate, the display screen or the like is subjected to excessive anti-glare processing, light representing the displayed image is also excessively scattered, so that suitable anti-glare processing is required. In FIG. 33, such anti-glare processing that scattering of less than an angle θ satisfying the following equation occurs is preferable:

$$\theta = \tan^{-1}(P/L) \qquad (11)$$

In the foregoing Equation (11), θ is the scattering angle, P is the array period of pixels in a liquid-crystal panel, and L is the optical distance from an aperture of the liquid-crystal panel to a surface which is subjected to anti-glare processing.

Referring to FIGS. 35 to 38, description is now made of an example of a liquid crystal display device, or an optical low-pass filter product with a polarizing plate (or a polarizing plate product with an optical low-pass filter) as a member constituting the liquid crystal display device.

Figure 35:
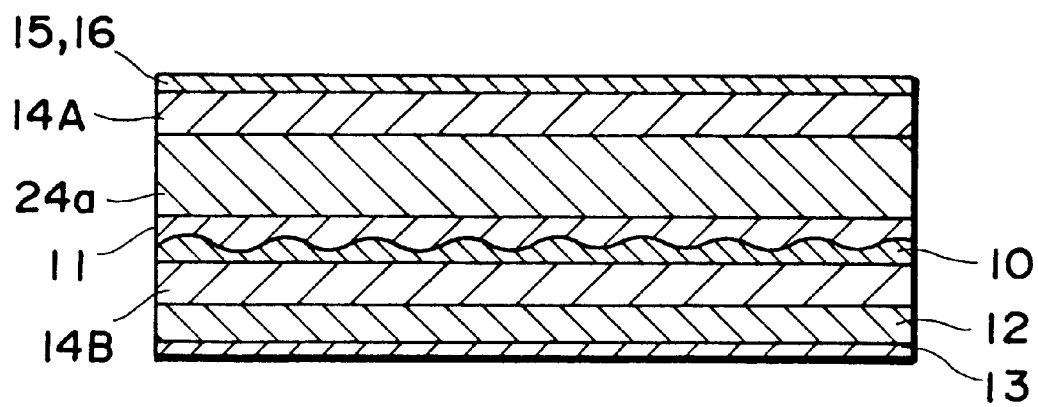
FIGS. 35 to 38 are cross-sectional views showing a polarizing plate with which an optical low-pass filter is integrated.

In FIG. 35, an optical low-pass filter 10 is formed on a protective layer 14B. This can be fabricated by filling a space between a sheet of the protective layer 14B and a stamper with a UV-setting resin, solidifying the resin by irradiation of ultraviolet rays, and removing the stamper, as described with reference to FIG. 28. The optical low-pass filter 10 is bonded to an inner surface of a polarizer 24a through a bonding layer (a resin layer) 11 in such an arrangement that its surface defined by projections and depressions are opposed to the polarizer 24a. A resin composing the optical low-pass filter 10 and a resin composing the bonding layer 11 differ in refractive indexes. A protective layer 14A is affixed to an outer surface of the polarizer 24a. An anti-reflection film 15 is formed on the outer surface of the protective layer 14A, or the outer surface of the protective layer 14A is subjected to anti-glare processing 16. An adhesive layer 12 is formed on the inner surface of the inside protective layer 14B, and the adhesive layer 12 is covered with a separator 13 (the processes indicated by broken lines in FIG. 28).

It is possible to strip the separator B and fix this product to a glass substrate of a liquid-crystal panel or a phase plate as described later through the adhesive layer 12.

Figure 36:
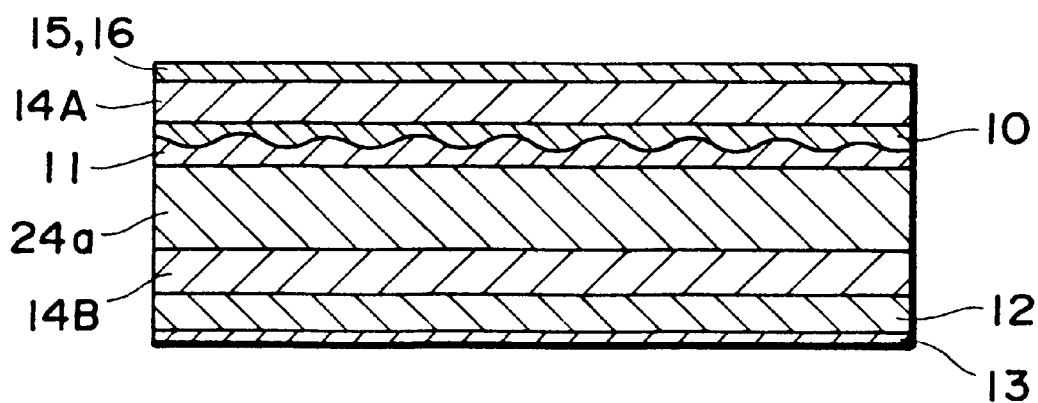

FIG. 36 illustrates an example in which an optical low-pass filter 10 is provided outside of a polarizer 24a. The optical low-pass filter 10 is formed on a protective layer 14A, and is bonded to an outer surface of the polarizer 24a by a bonding layer 11. In FIG. 36, the same components as those shown in FIG. 35 are assigned the same reference numerals and hence, the overlapped description is avoided.

Figure 37:
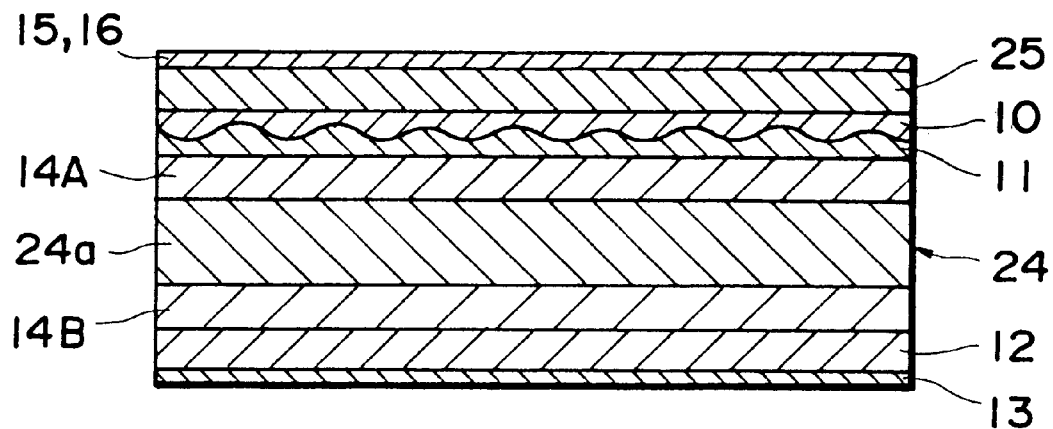

In FIG. 37, an optical low-pass filter 10 is formed on one surface of a transparent substrate 25 composed of TAC, PC, PMMA, etc. The optical low-pass filter 10 is formed integrally with the substrate 25 by the above described method of filling a space between the substrate 25 and a stamper with a UV-setting resin, solidifying the resin, and then removing the stamper. A polarizer 24a and protective layers 14A and 14B on both surfaces of the polarizer 24a are combined with each other, thereby constructing a polarizing plate 24. The optical low-pass filter 10 is bonded to an outer surface of the polarizing plate 24 by a bonding layer 11 with its surface defined by projections and depressions directed toward the polarizing plate 24. The substrate 25 integrated with the optical low-pass filter 10 is positioned outside of the optical low-pass filter 10. An anti-reflection film 15 is formed on an outer surface of the substrate 25, or an outer surface of the substrate 25 is subjected to anti-glare processing 16. An adhesive layer 12 is provided on an inner surface of the polarizing plate 24 (an inner surface of the protective layer 14B), and the surface of the adhesive layer 12 is covered with a separator 13.

Figure 38:
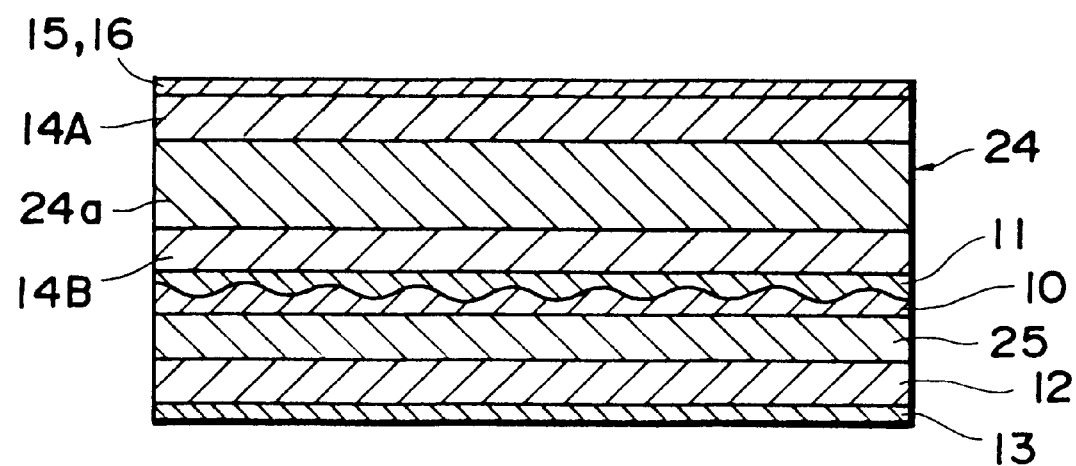

In a structure shown in FIG. 38, an optical low-pass filter 10 is bonded to an inner surface of a polarizing plate 24 through a bonding layer 11. An anti-reflection film 15 is formed on the outer surface of the outside protective layer 14A, or the outer surface of the outside protective layer 14A is subjected to anti-glare processing 16. An adhesive layer 12 is formed on an inner surface of a substrate 25 which is integrated with the optical low-pass filter 10, and a separator 13 is provided on an inner surface of the adhesive layer 12.

The products shown in FIGS. 37 and 38 are also easily incorporated into a liquid crystal display device by stripping the separator 13 and combining the product with a glass substrate of a liquid-crystal panel or a phase plate through the adhesive layer 12.

Figure 39:
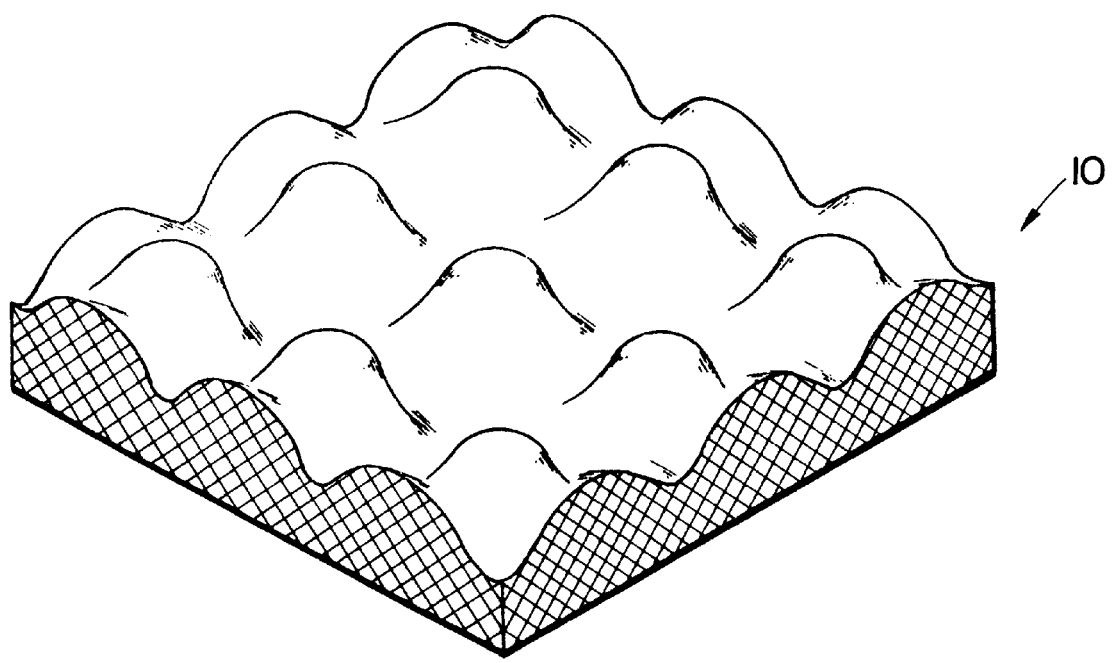
FIGS. 39 and 40 are perspective views showing other examples of the optical low-pass filter.

FIG. 39 illustrates an example in which a scattering surface is formed on an end face (a side surface) of an optical low-pass filter. The scattering surface is a roughened surface, from which light is irregularly reflected.

Figure 40:
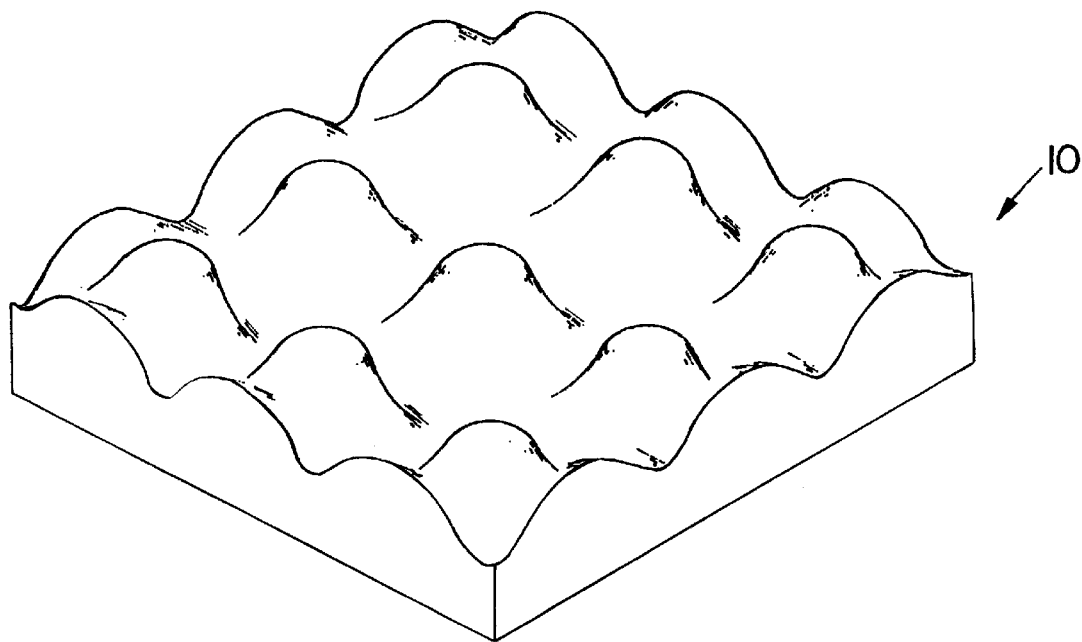

FIG. 40 illustrates an example in which a light absorbing surface (for example, painted black) is formed on an end face (a side surface) of an optical low-pass filter.

The scattering surface and the light absorbing surface perform the following two functions. The first function is preventing disturbing light incident on the optical low-pass filter from the outer surface (a flat surface) thereof (through an anti-reflection film in some instances) from being regularly reflected on its end face and incident on a liquid-crystal panel. The second function is preventing light from a light source which has passed through the liquid-crystal panel from entering the optical low-pass filter, regularly reflected on its end face and exiting outward from the optical low-pass filter to enter the human eyes. Consequently, a displayed image becomes easy to see.

Description is made of applications of the above described optical low-pass filter or an image display device (a liquid crystal display device) having the optical low-pass filter.

Figure 41:
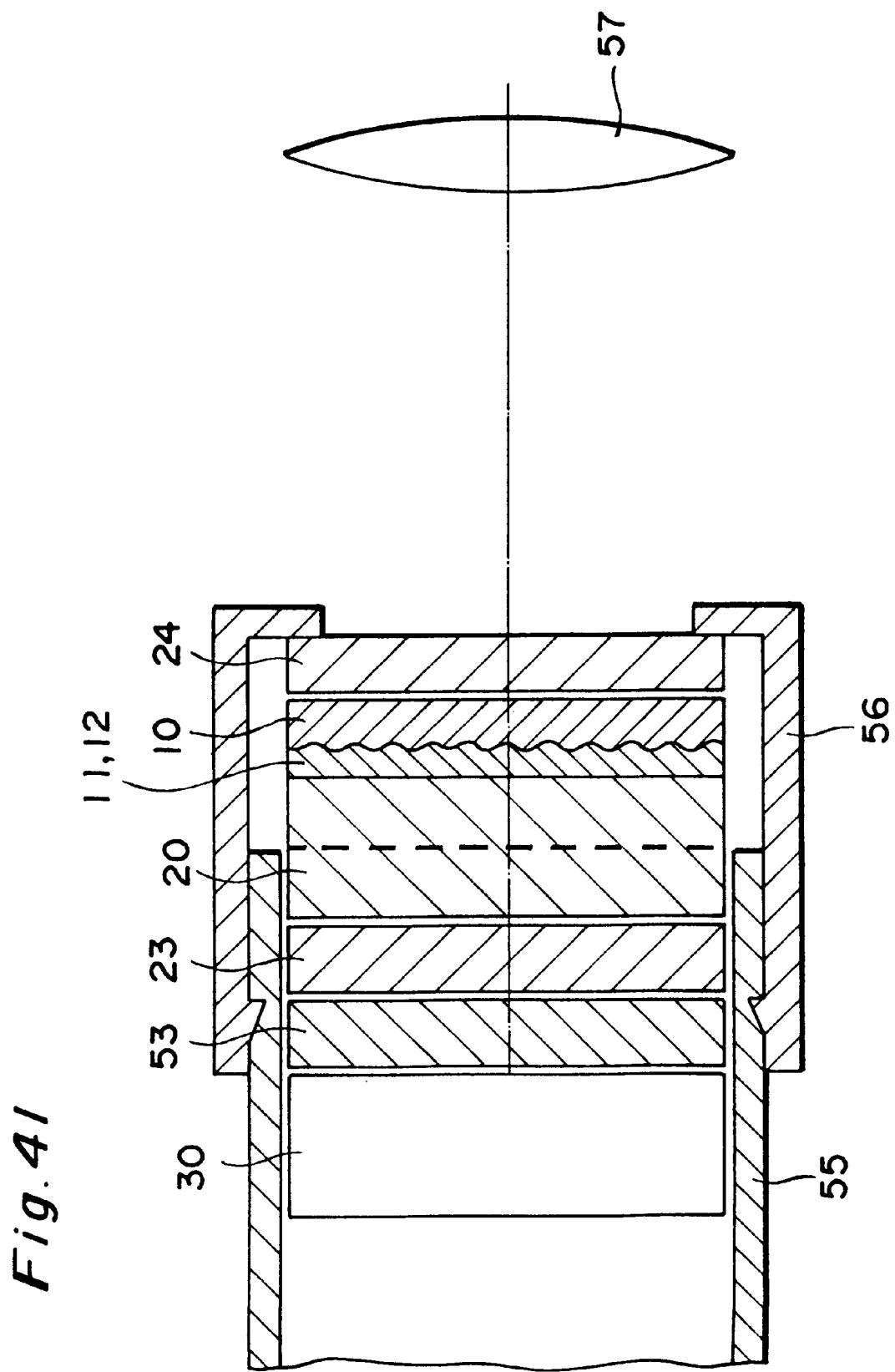
FIG. 41 is a cross-sectional view showing the structure of a view finder.

FIG. 41 illustrates an optical system of a view finder provided in a video camera including an electronic still camera. A light source 30, a light diffusing plate 53, a polarizing plate 23, a liquid-crystal panel 20, an optical low-pass filter 10 and a polarizing plate 24 are fitted in a cylinder or a square cylinder 55 in this order, and a cap 56 is attached to its front end. The optical low-pass filter 10 is fixed to the front surface of the liquid-crystal panel 20 through a bonding layer 11 or an adhesive layer 12.

A video signal obtained from an imaging device in the video camera is subjected to suitable signal processing, and is then applied to the liquid-crystal panel 20. An image being picked up is displayed on the liquid-crystal panel 20. A lens 57 is provided ahead of the liquid-crystal panel 20 if necessary.

Figure 42:
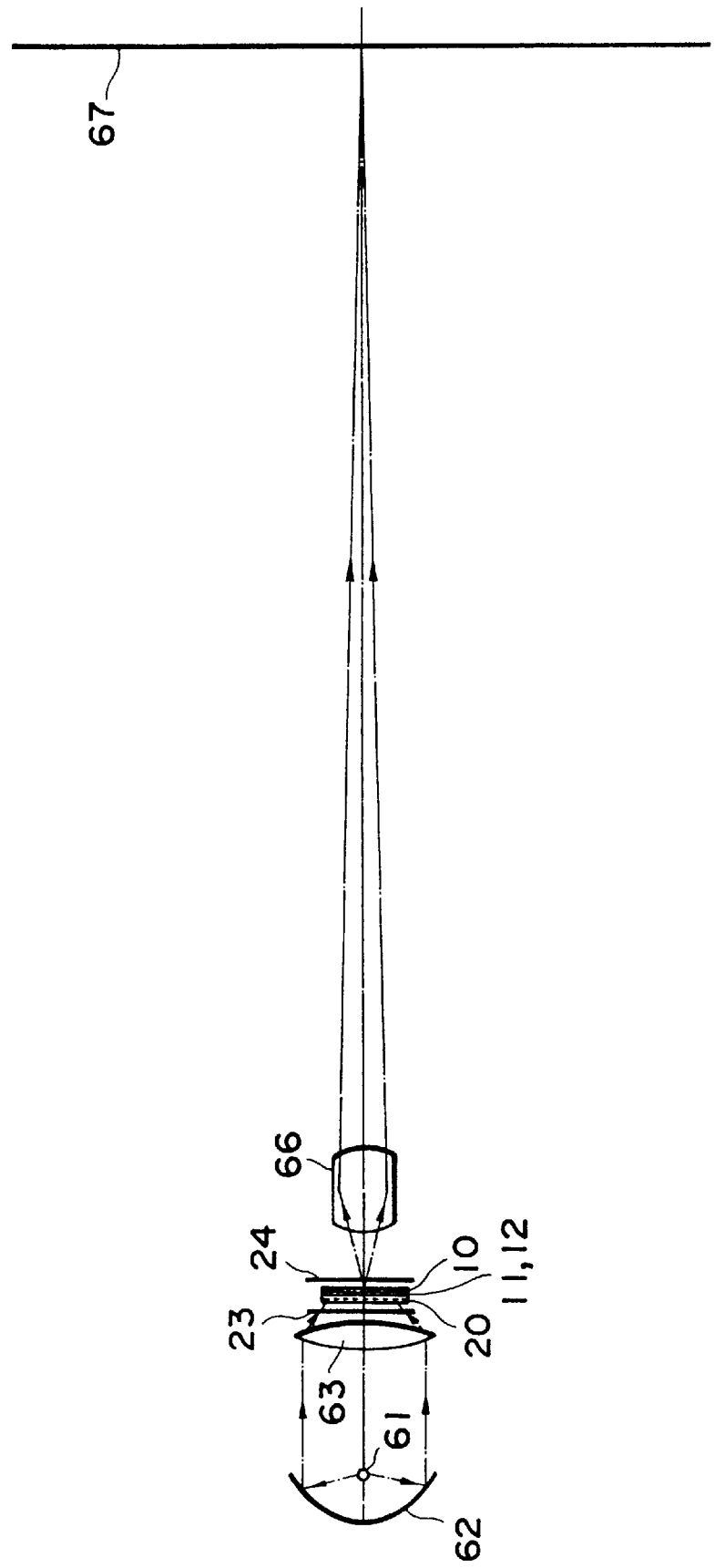
FIG. 42 is a diagram showing the structure of a TV projector.

FIG. 42 illustrates the entire optical structure of a liquid-crystal TV (television) projector.

Light emitted by a light source 61 is reflected by a parabolic mirror 62 arranged behind the light source 61, so that formed beams of the light are made approximately parallel to each other, and are condensed by a condenser lens 63. A liquid-crystal panel 20 is arranged on an optical path of the light beams condensed by the condenser lens 63. Two polarizing plates 24 and 23 whose directions of polarization are perpendicular to each other are respectively provided ahead of and behind the liquid-crystal panel 20. An optical low-pass filter 10 is fixed to the front surface of the liquid-crystal panel 20 through a bonding layer 11 or an adhesive layer 12.

The liquid-crystal panel 20 is controlled by a video signal fed from external, as described above. Consequently, an image represented by the image signal appears on the surface of the liquid-crystal panel 20. An image represented by the light which has passed through the liquid-crystal panel 20 and the polarizing plates 23 and 24 is formed on a distant screen 67 through an image-forming lens 66.

Figure 43:
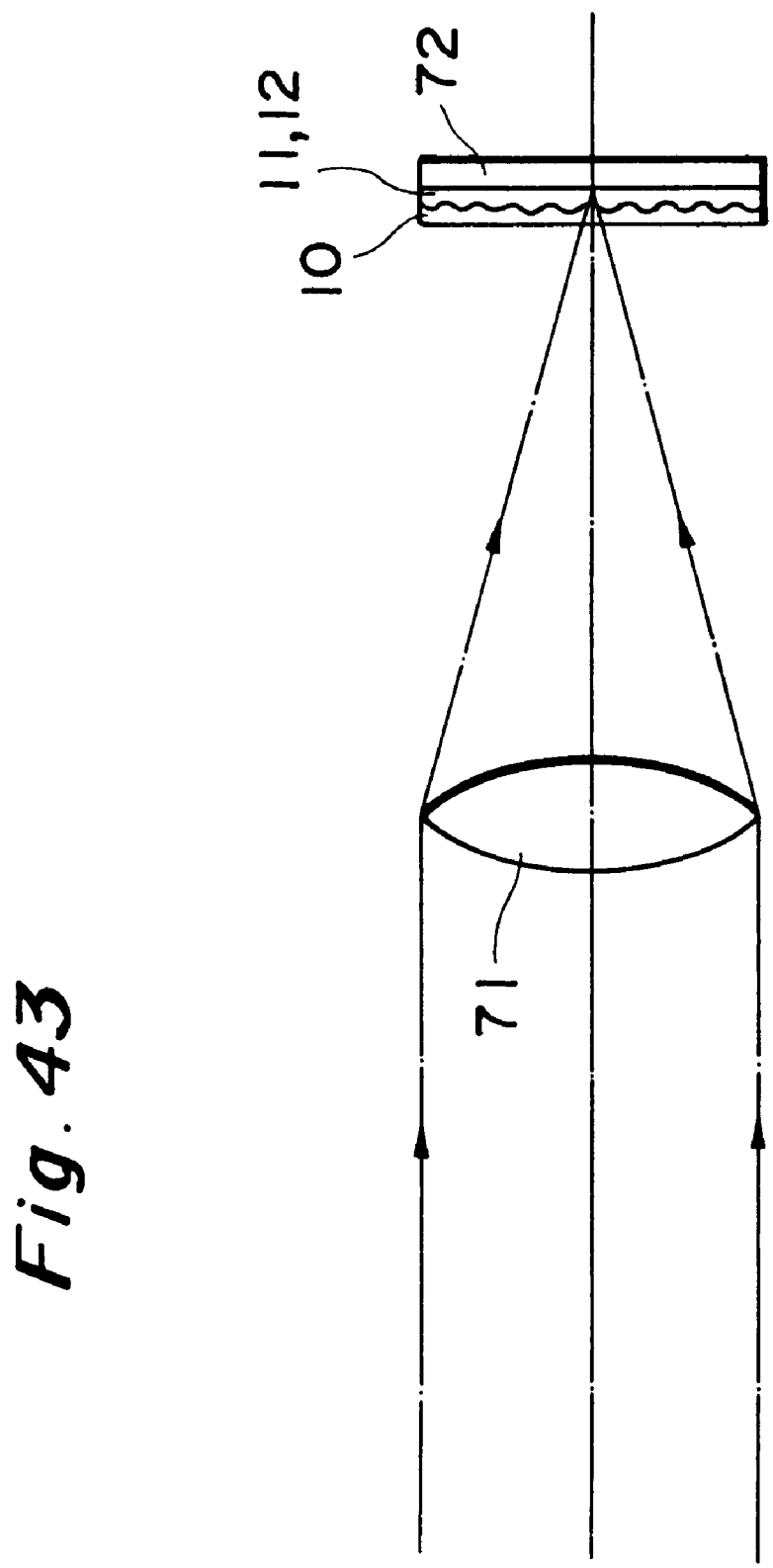
FIG. 43 is a diagram showing the structure of an imaging device.

FIG. 43 illustrates an imaging optical system of a video camera. An optical low-pass filter 10 is fixed to the front surface of a solid state imaging device (e.g., a CCD (charge Coupled Device)) 72 through a bonding layer 11 or an adhesive layer 12. A subject image formed by an imaging lens 71 is formed on the imaging device 72 through the optical low-pass filter 10.

It is preferable that the cut-off spatial frequency of the optical low-pass filter 10 is set to approximately the reciprocal of a value which is twice the array period of a number of photoelectric converting elements arranged on the imaging device 72. Consequently, sampling noise generated in the imaging is reduced.

Figure 44:
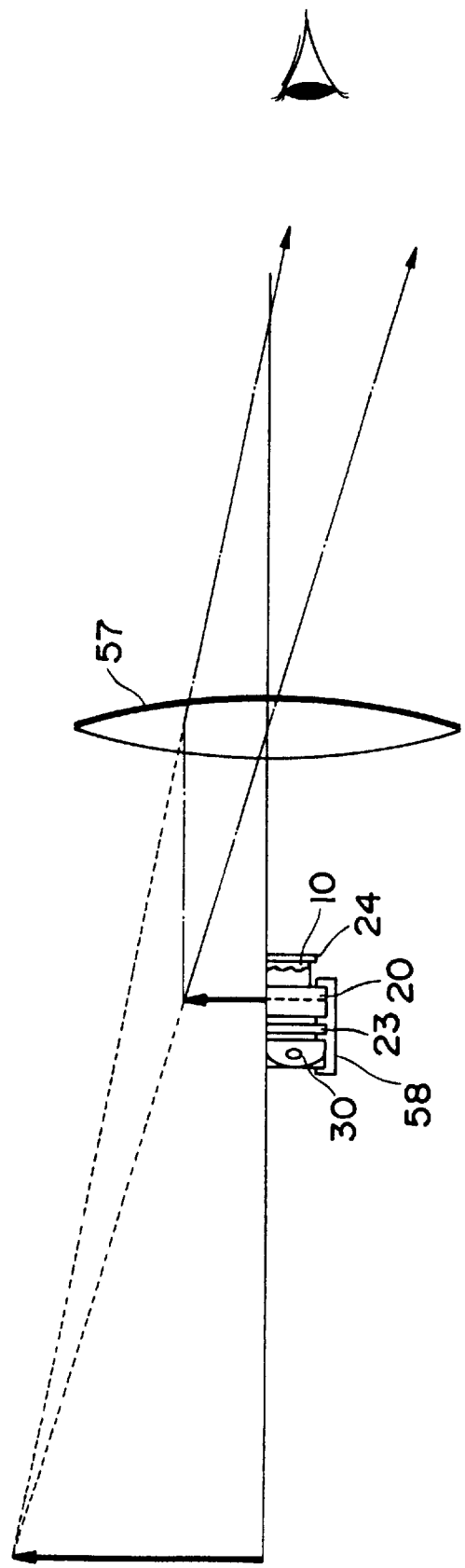
FIG. 44 is a diagram showing the optical structure of a head mount display device.

FIG. 44 illustrates an application to a head mount display device used with it being directly mounted on the human head. A liquid crystal display device fixed to a frame 58 is contained in the head mount display device. The liquid crystal display device comprises a light source 30, a liquid-crystal panel 20, polarizing plates 23 and 24, and an optical low-pass filter 10. The optical low-pass filter 10 is fixed to the polarizing plate 24 (or the liquid-crystal panel 20) by a bonding layer or an adhesive layer. A user sees a virtual image, which is formed by a lens 57, of an image displayed on the liquid crystal display device through the eyepiece 57.

It goes without saying that the above described liquid crystal display device having the optical low-pass filter is also applicable to a portable television.

The polarizing plates are arranged ahead of and behind the liquid-crystal panel, as described above. The polarizing plate on the side of the light source is for converting randomly polarized light from the light source into linearly polarized light. The directions of polarization of the polarizing plates perpendicularly intersect each other. It is premised that light passing through the liquid-crystal panel is linearly polarized light. When the linearly polarized light passes through a liquid crystal, however, the light may be converted into elliptically polarized light depending on the type of the liquid crystal. The liquid crystal is an STN (Super Twisted Nematic) liquid crystal, for example. In such a liquid crystal display device, a phase plate is arranged between the liquid-crystal panel and the outer polarizing plate in order to improve the contrast of a displayed image. The elliptically polarized light is converted into linearly polarized light by the phase plate. Also in a liquid-crystal panel of an active type (a TFT (Thin Film Transistor) type or an MIM (Metal Insulator Metal) type), the utilization of the phase plate has been studied to improve the contrast.

In the above described embodiment, the optical low-pass filter is fixed to the glass substrate or the polarizing plate of the liquid crystal panel through the bonding layer or the adhesive layer.

In the following embodiment, an optical low-pass filter is formed utilizing the above described phase plate.

Figure 45:
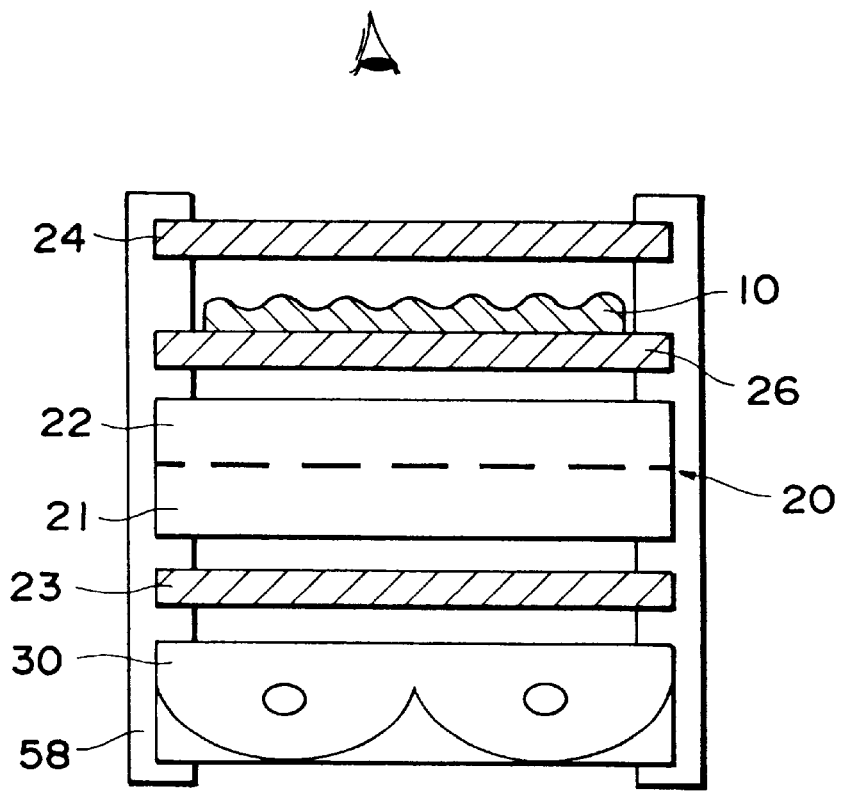
FIG. 45 is a cross-sectional view showing a liquid crystal display device having a phase plate.

FIG. 45 illustrates a structure of a liquid crystal display device including a phase plate. Also in FIG. 45, the same components as those already described are assigned the same reference numerals and hence, the overlapped description is avoided.

A light source 30, a polarizing plate 23, a liquid-crystal panel 20, a phase plate 26 and a polarizing plate 24 are fixed to a frame 58 in this order from the inside to the outside, thereby constructing a liquid crystal display device. In short, the above described microlens array is arranged on the light-incident side of the liquid-crystal panel 20.

The phase plate is fabricated by uniaxially elongating a transparent resin having birefringence such as polycarbonate (PC) or polyvinyl alcohol (PVA) and cutting the transparent resin to suitable sizes An optical low-pass filter 10 is integrally formed on the phase plate 26. A space between the phase plate 26 and a stamper (having a surface defined by projections and depressions of the optical low-pass filter) is filled with a UV-setting resin, ultraviolet rays are irradiated to solidify the resin, and the stamper is finally removed, thereby to make it possible to fabricate the optical low-pass filter integrated with the phase plate.

Figure 47:
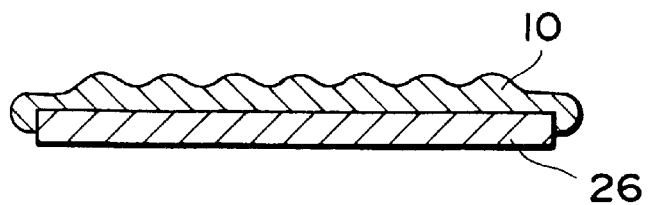

The optical low-pass filter 10 may be loaded on the phase plate 26 excluding its periphery, as shown in FIG. 45. Alternatively, a small amount of the optical low-pass filter 10 may stick out the periphery of the phase plate 26, as shown in FIG. 47. In either case, it is desirable that the size of the optical low-pass filter (the UV-setting resin) 10 (the spreading of a surface) is approximately the same as or slightly smaller than that of the phase plate 26. It is desirable that the size of the optical low-pass filter 10 is approximately the same as or slightly smaller than that of the liquid-crystal panel 20.

Furthermore, it is preferable that the thickness of the optical low-pass filter 10 is smaller than the thickness of the phase plate 26. If the optical low-pass filter is made too thick, the optical low-pass filter shrinks, to be easily peeled from the phase plate 26 when the UV-setting resin is solidified.

Figure 46:
FIGS. 46 and 47 are cross-sectional views showing a phase plate on which an optical low-pass filter is integrally formed.

FIG. 46 illustrates an example in which projections and depressions (a diffraction grating) performing the optical low-pass filtering function are directly formed on one surface of a phase plate 26A. This can be fabricated by previously heating the phase plate and pressing a stamper having projections and depressions of an optical low-pass filter against one surface of the phase plate (embossing or thermal transfer).

In the liquid crystal display device having the phase plate, the optical low-pass filter is thus integrated with the phase plate. Even if the optical low-pass filter is provided, therefore, the number of components of the liquid crystal display device is not increased, thereby to make it possible to keep the structure of the liquid crystal display device simple.

Description is now made of various fixing structures of an optical low-pass filter integrated with a phase plate (a phase plate integrated with an optical low-pass filter) in a liquid crystal display device.

Figure 48:
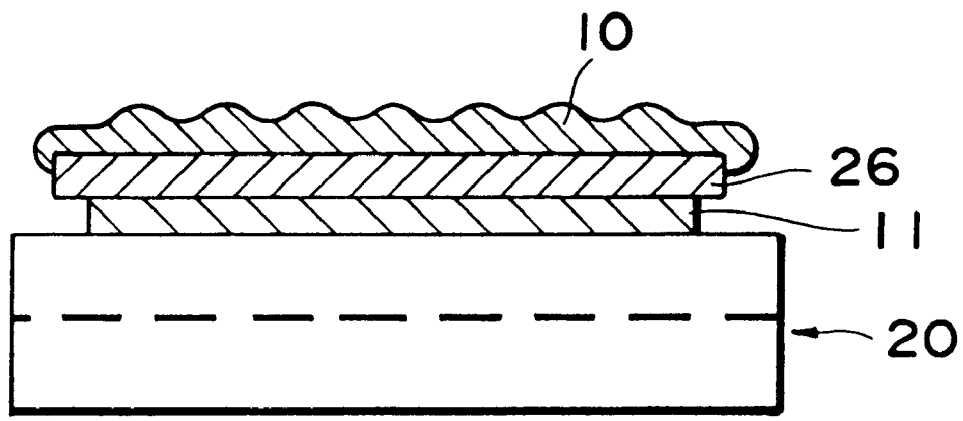
FIGS. 48 to 61 are cross-sectional views showing a part of a liquid crystal display device having a phase plate.

FIG. 48 illustrates a structure in which a phase plate 26 integrated with an optical low-pass filter 10 is fixed to one surface (a glass substrate) of a liquid-crystal panel 20 through a bonding layer 11. In FIG. 48 and figures as described later, only components required for description are taken out of a liquid crystal display device and are illustrated, while the other components are not illustrated.

Figure 49:
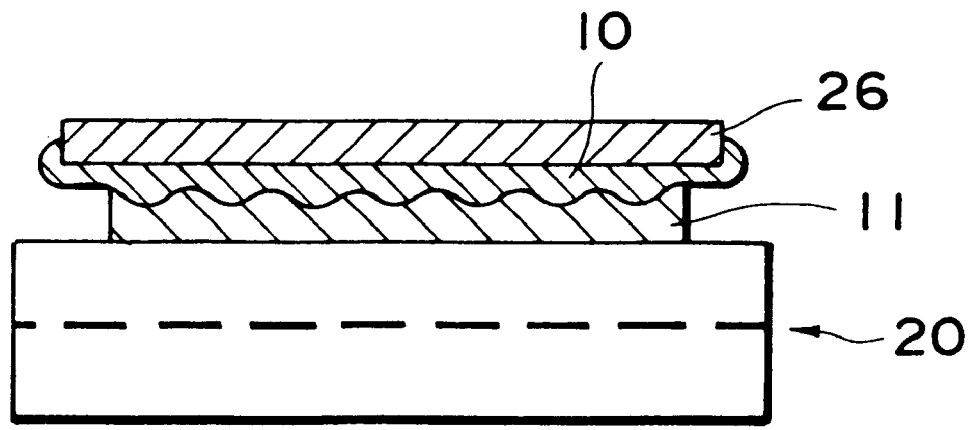

In FIG. 49, an optical low-pass filter 10 integrated with a phase plate 26 is fixed to a liquid-crystal panel 20 through a bonding layer 11 with its surface defined by projections and depressions directed toward the liquid-crystal panel 20. It goes without saying that the refractive index of a resin composing the optical low-pass filter 10 and the refractive index of a resin composing the bonding layer 11 differ from each other. Examples of the resin composing the bonding layer 11 include a UV-setting resin or an epoxy resin, as described above.

In either structure, the surface of the liquid-crystal panel 20 and the phase plate 26 are kept parallel to each other.

The phase plate and the optical low-pass filter are thus integrated with the liquid-crystal panel, thereby to make it possible to miniaturize the display device and facilitate the assembling thereof.

Figure 50:
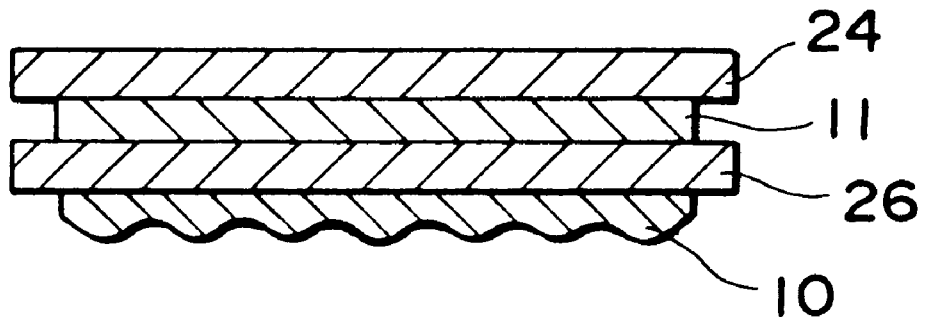
Figure 51:
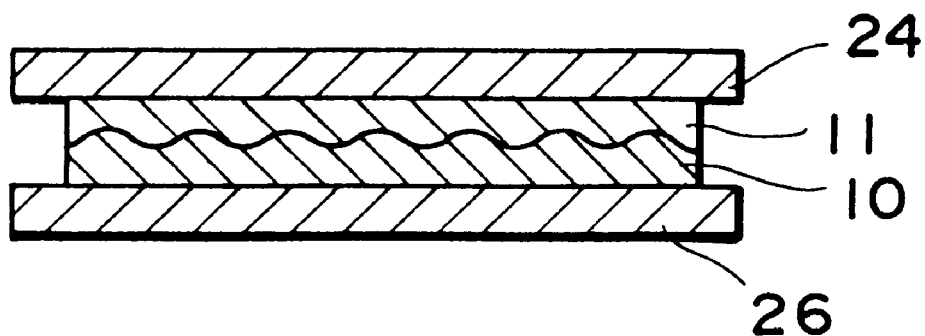

FIGS. 50 and 51 illustrate structures in which a phase plate and an optical low-pass filter are integrated with an outer polarizing plate. This structure also makes it possible to miniaturize a display device and facilitate the assembling thereof.

In FIG. 50, a phase plate 26 is fixed to a polarizing plate 24 through a bonding layer 11. In FIG. 51, an optical low-pass filter 10 is fixed to a polarizing plate 24 through a bonding layer 11 with its surface defined by projections and depressions directed toward the polarizing plate 24. The optical low-pass filter 10 and the bonding layer 11 differ in refractive indexes. Also in either structure, the polarizing plate 24 and the phase plate 26 are parallel to each other.

Figure 52:
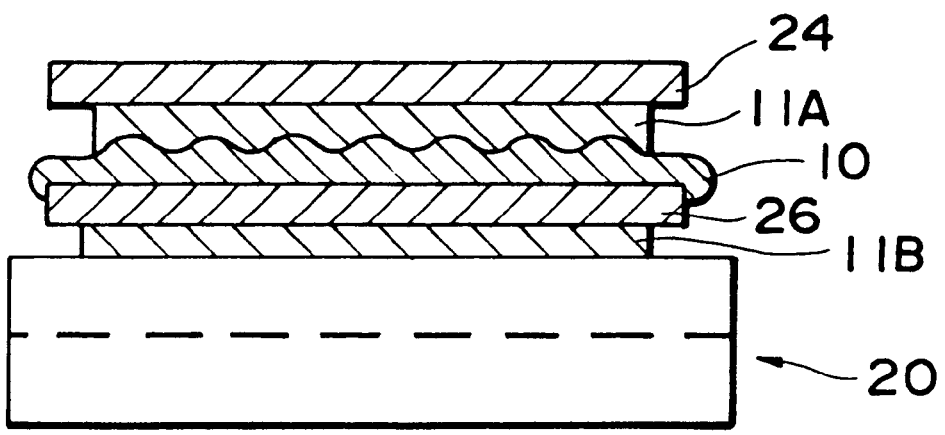
Figure 53:
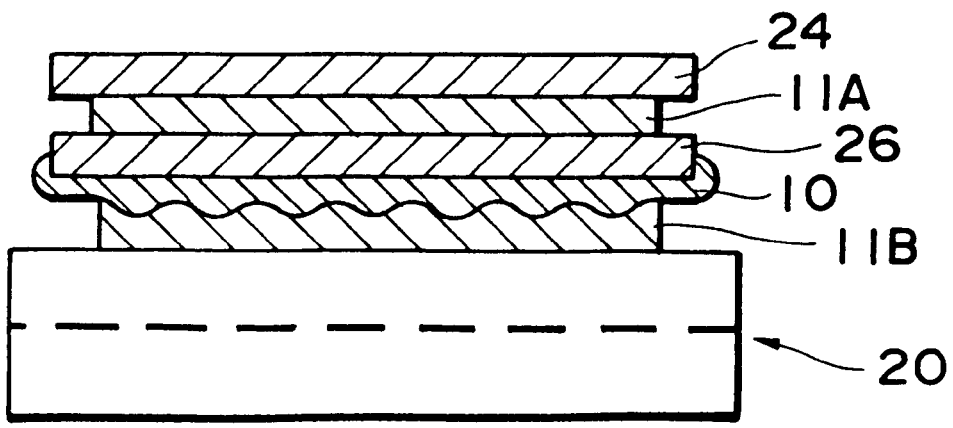

FIGS. 52 and 53 illustrate structures in which integration is further developed.

In FIG. 52, a phase plate 26 is fixed to one surface of a liquid-crystal panel 20 through a bonding layer 11B. An optical low-pass filter 10 is integrally formed on the phase plate 26. A polarizing plate 24 is fixed to the optical low-pass filter 10 through a bonding layer 11A. The optical low-pass filter 10 and the bonding layer 11A differ in refractive indexes. One surface (a glass substrate) of the liquid-crystal panel 20, the phase plate 26 and the polarizing plate 24 are parallel to each other.

The structure shown in FIG. 53 differs from the structure shown in FIG. 52 in that an optical low-pass filter 10 is directed toward a liquid-crystal panel 20. The optical low-pass filter 10 and the bonding layer 11B differ in refractive indexes.

Figure 54:
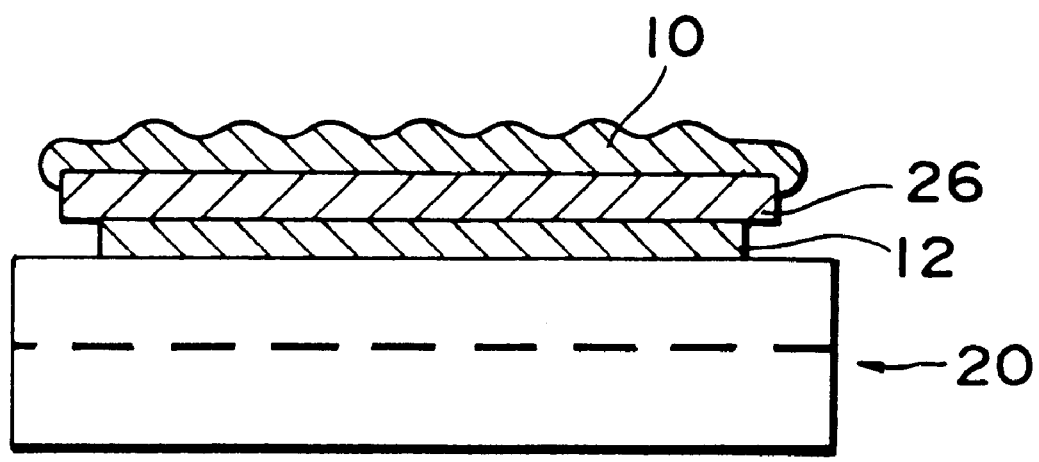

FIG. 54 illustrates a structure in which the bonding layer is replaced with an adhesive layer. A phase plate 26 integrated with an optical low-pass filter 10 is fixed to one surface of a liquid-crystal panel 20 through an adhesive layer 12. In the above described all structures, the bonding layer can be replaced with an adhesive layer.

Figure 55:
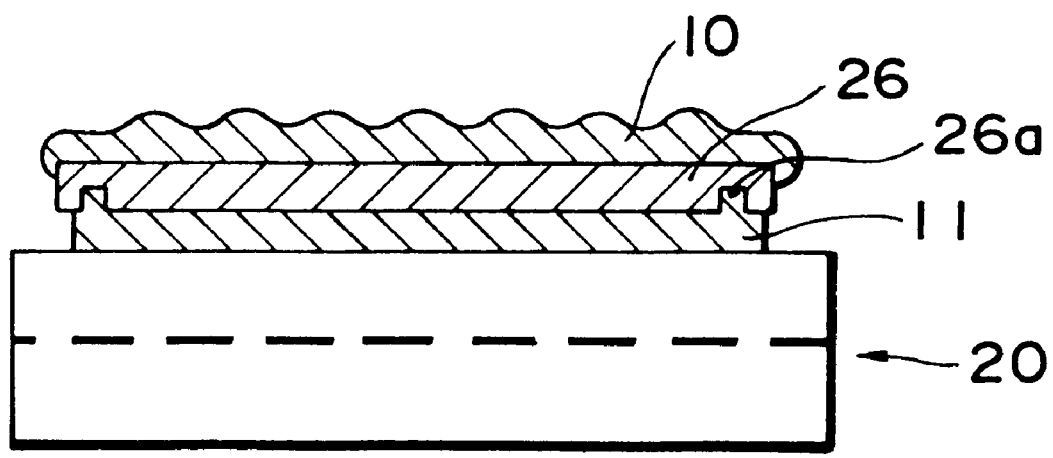

A structure shown in FIG. 55 is the same as the structure shown in FIG. 48 except that a groove 26a is formed on a phase plate 26 on its outer circumference of a surface on the opposite side of a surface, on which an optical low-pass filter 10 is loaded, thereby to make it possible to prevent a bonding resin 11 from sticking out.

Figure 56:
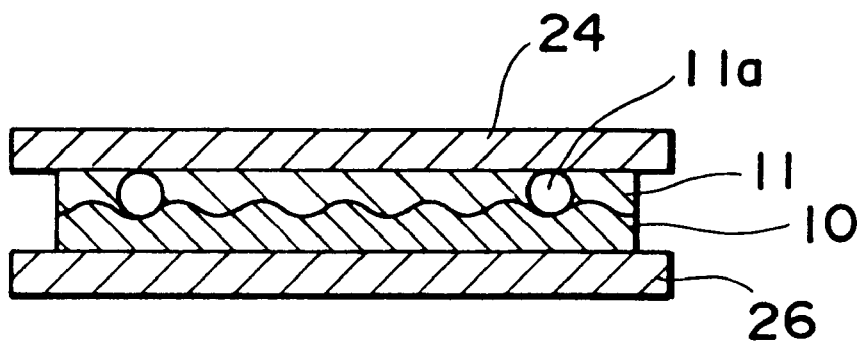
Figure 57:
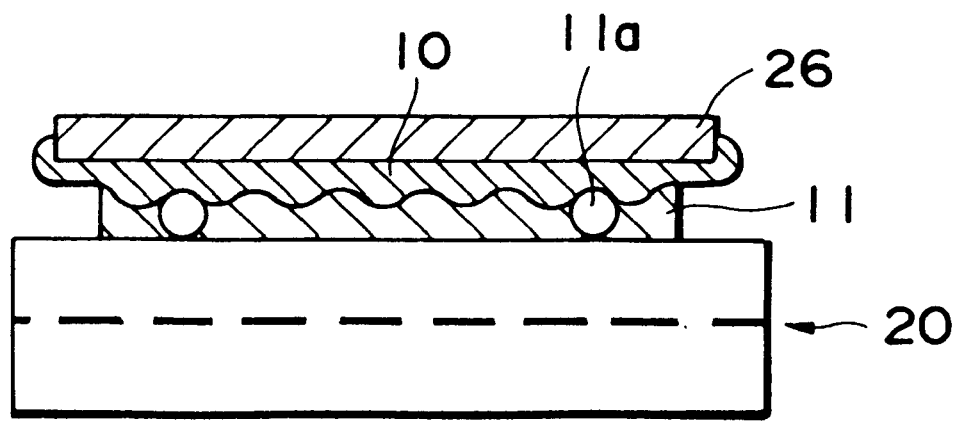

FIGS. 56 and 57 illustrate structures in which a spacer 11a is arranged in a bonding layer 11 in order to keep the thickness of the bonding layer 11 constant and keep a phase plate 26, a polarizing plate 24 or a liquid-crystal panel 20 parallel to each other. It is preferable that the refractive index of the spacer 11a and the refractive index of the bonding layer 11 are equal or approximately equal.

Figure 58:
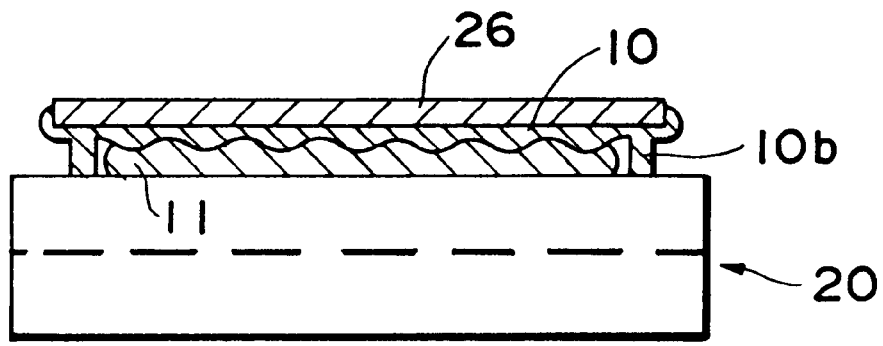

FIG. 58 illustrates a structure in which in forming an optical low-pass filter 10, a projected wall 10b is formed around an optical low-pass filter 10 integrally with the optical low-pass filter 10. The projected wall 10b abuts against a surface of a liquid-crystal panel 20, and the surfaces of a phase plate 26 and the liquid-crystal panel 20 are kept parallel to each other. A space formed within the projected wall 10b is filled with a bonding resin 11. The projected wall 10b can be formed by previously forming in a stamper for forming the optical low-pass filter a groove corresponding to the projected wall 10b.

Figure 59:
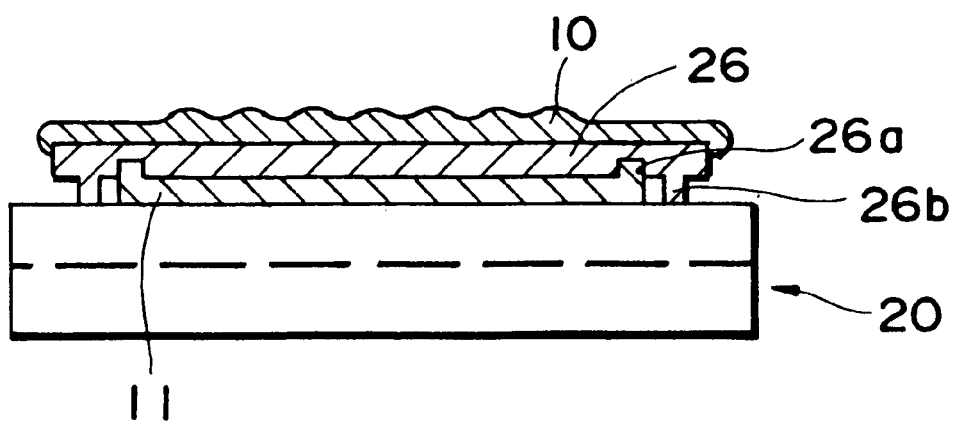

In FIG. 59, a projected wall 26b is formed around a surface, on which an optical low-pass filter 10 is not formed, of a phase plate 26, and a groove 26a is formed inside of the projected wall 26b. The projected wall 26b is brought into contact with a surface of a liquid-crystal panel 20, whereby the phase plate 26 is kept parallel to the liquid-crystal panel 20. A space within the projected wall 26b is filled with a bonding resin 11. The groove 26a serves to absorb the extra resin. The phase plate having the projected wall 26b and the groove 26a is fabricated by embossing or the like.

Figure 60:
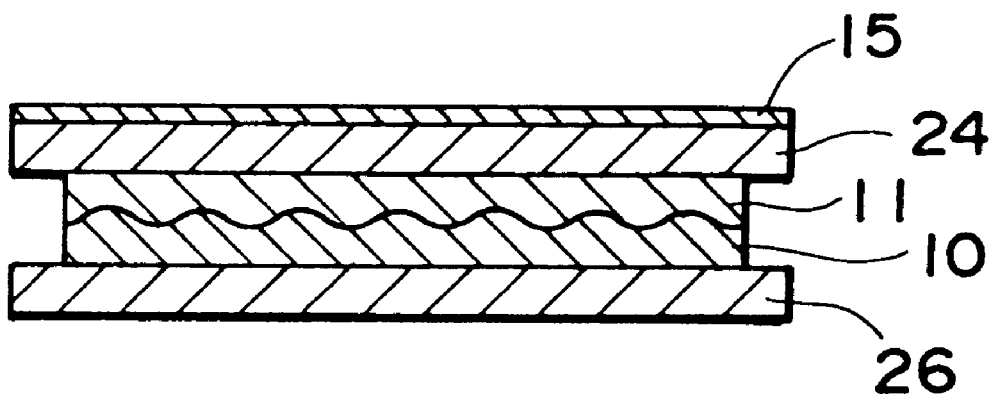

FIG. 60 illustrates a structure in which an anti-reflection film 15 is provided on an outer surface of a polarizing plate 24 in the structure shown in FIG. 51.

Figure 61:
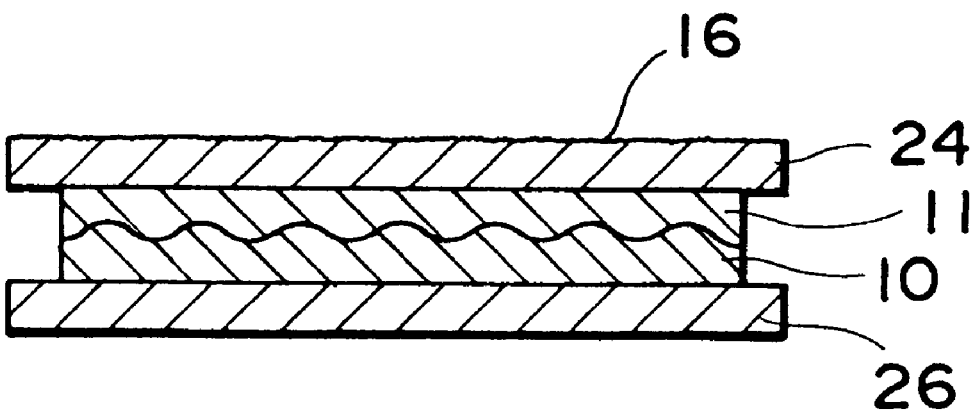

FIG. 61 illustrates a structure in which an outer surface of a polarizing plate 24 is subjected to anti-glare processing 16 instead of forming the anti-reflection film 15.

The anti-reflection film 15 or the anti-glare processing 16 is applicable to the above described all structures.

FIGS. 62 to 66 illustrate structures of various articles of manufacture each comprising an adhesive layer covered with a separator and simply fixable.

Figure 62:
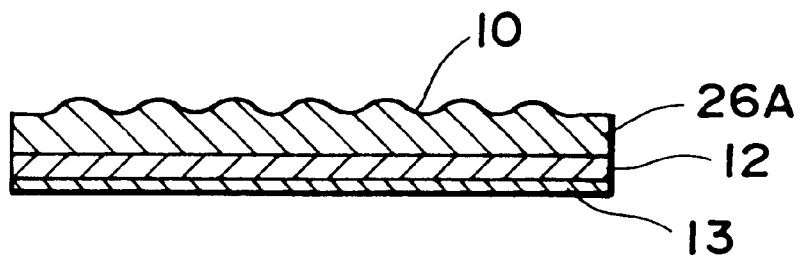
FIGS. 62 to 66 are cross-sectional views showing a phase plate on which an optical low-pass filter is integrally formed.

A product shown in FIG. 62 has a structure in which an adhesive layer 12 is provided on a phase plate 26A with which the optical low-pass filter 10 shown in FIG. 46 is integrated, on a surface on which the optical low-pass filter 10 is not formed, and the surface of the adhesive layer 12 is covered with a separator 13.

Figure 63:
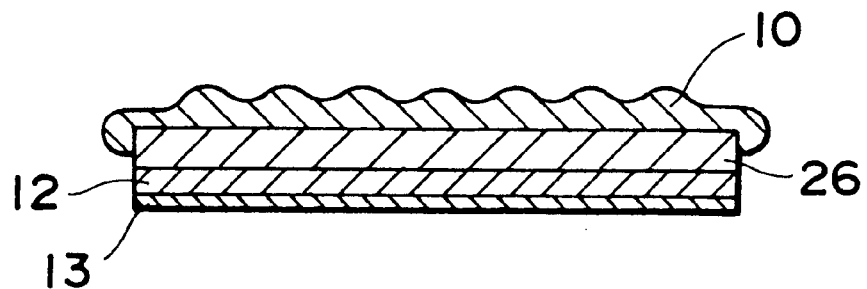

FIG. 63 illustrates a structure of a product in which an adhesive layer 12 and a separator 13 are provided on a phase plate 26 shown in FIG. 47 with which the optical low-pass filter 10 is integrated, on a surface on which the optical low-pass filter 10 is not provided.

Figure 64:
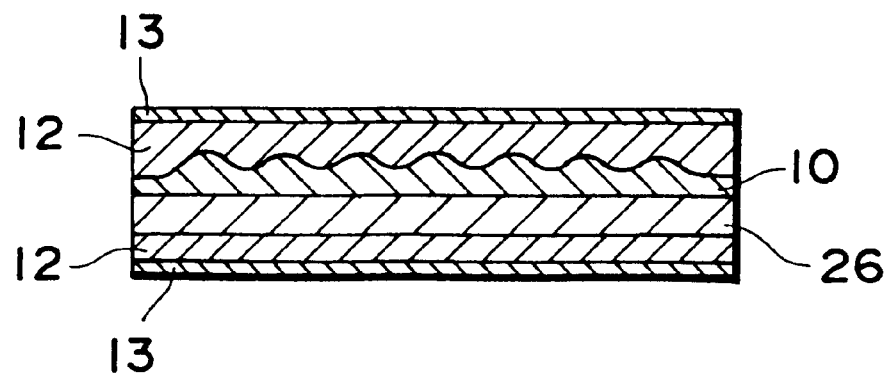

FIG. 64 illustrates a product having a structure in which an adhesive layer 12 and a separator 13 are provided also on a surface defined by projections and depressions of an optical low-pass filter 10 in the structure shown in FIG. 63. This product can be utilized for the display devices having the structures respectively shown in FIGS. 52 and 53 (the bonding layer is replaced with the adhesive layer).

Figure 65:
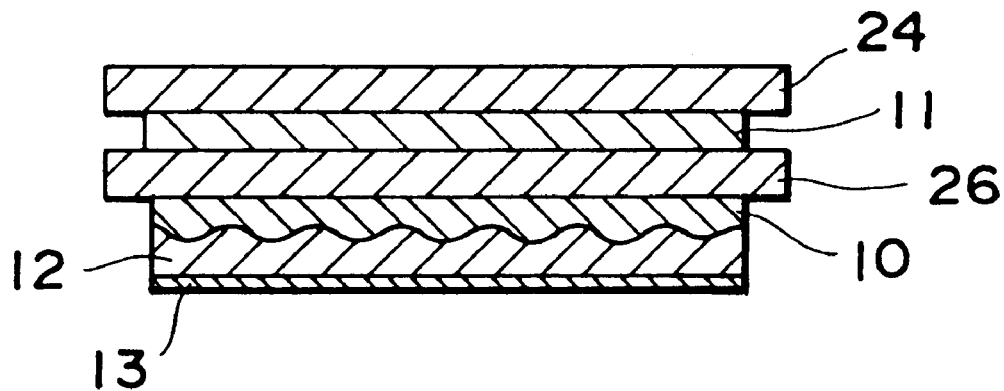
Figure 66:
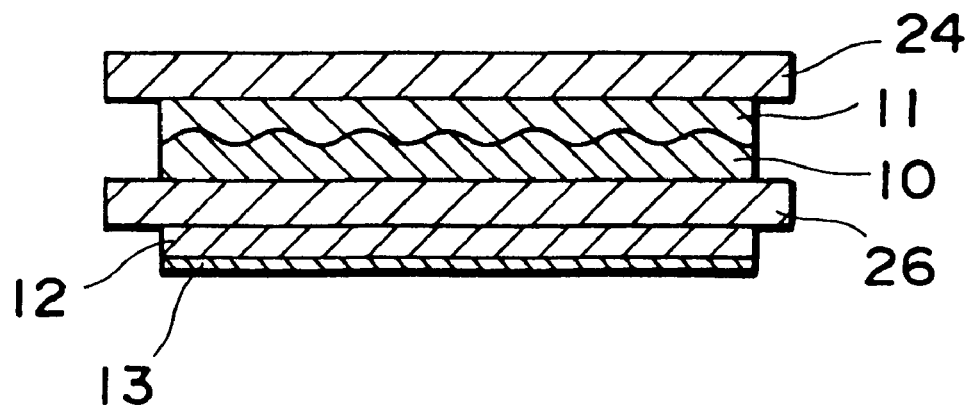

FIGS. 65 and 66 illustrate structures in which an adhesive layer and a separator are provided in the structures respectively shown in FIGS. 50 and 51 (the structures in which the phase plate is integrated with the polarizing plate).

In FIG. 65, an adhesive layer 12 and a separator 13 are provided so as to cover a surface defined by projections and depressions of an optical low-pass filter 10. In FIG. 66, an adhesive layer 12 and a separator 13 are provided on a surface, on which an optical low-pass filter 10 is not provided, of a phase plate 26. These products are also suitably utilized when a display device having the structure shown in FIG. 52 or 53 is fabricated.

Also in such a liquid crystal display device including a phase plate, the refractive indexes of two components in contact with each other are made equal or approximately equal, thereby to make it possible to reduce Fresnel reflection occurring in the interface of the components. Further, it is possible to form the scattering surface as shown in FIG. 39 and the light absorbing surface as shown in FIG. 40 on an end face (a side surface) of the optical low-pass filter.

Description is finally made of applications of a liquid crystal display device comprising a phase plate.

Figure 67:
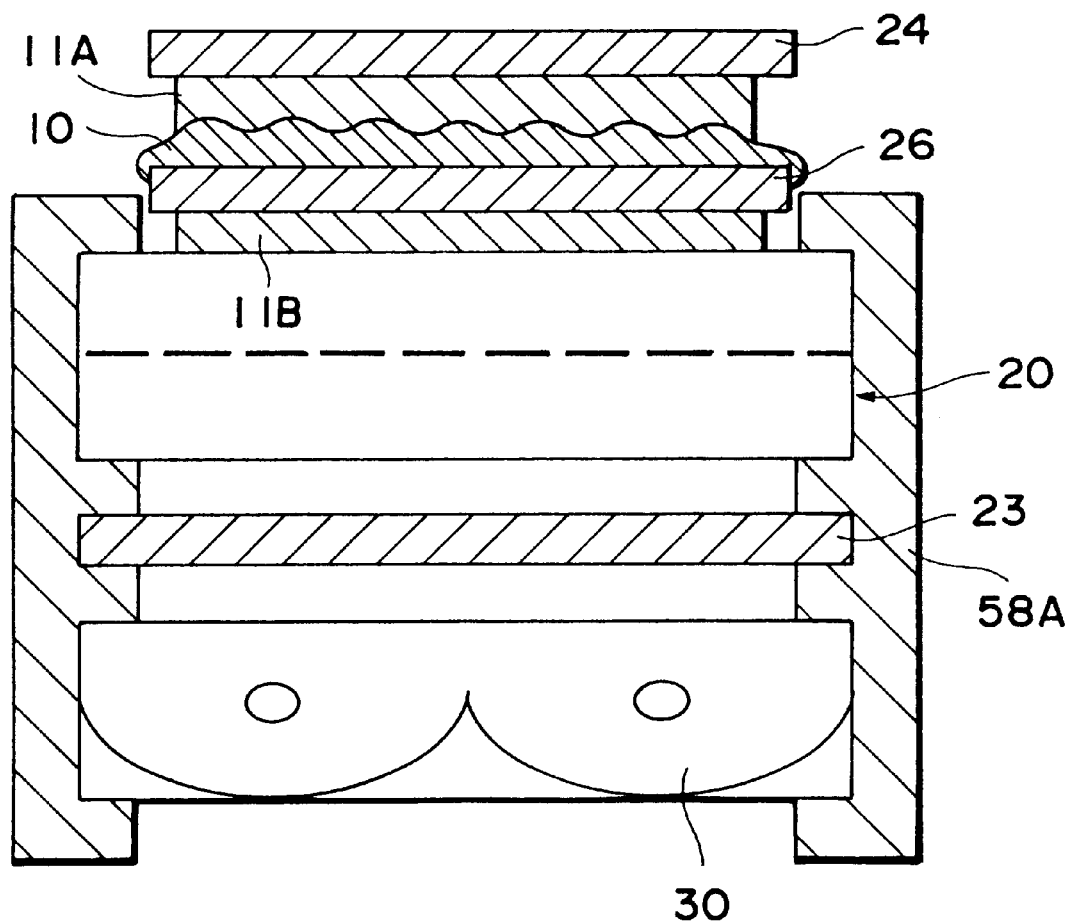
FIG. 67 is a cross-sectional view showing display device portion in a portable television.

FIG. 67 illustrates a display device portion in a portable television. A light source 30, a polarizing plate 23 and a liquid-crystal panel 20 are attached and fixed to a frame 58A. A phase plate 26, an optical low-pass filter 10 and a polarizing plate 24 are fixed to the liquid-crystal panel 20 in the same structure as that shown in FIG. 52. The number of components which are assembled in the frame 58A is reduced, whereby the assembling is simplified. A microlens array is provided between the light source 30 and the liquid-crystal panel 20, if necessary. In addition, an ant-reflection film is formed on an outer surface of the polarizing plate 24, or an outer surface of the polarizing plate 24 is subjected to anti-glare processing.

Figure 68:
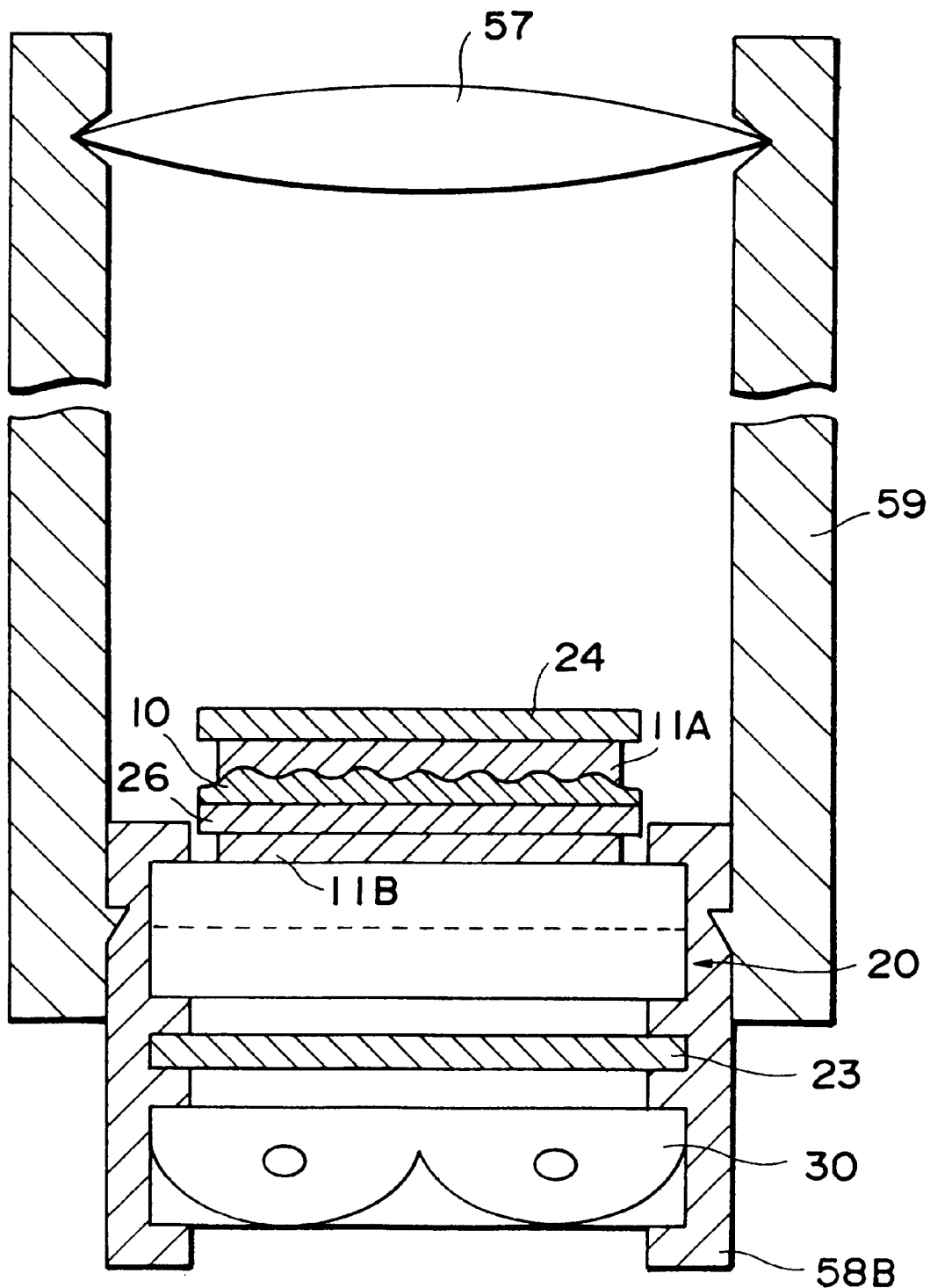
FIG. 68 is a cross-sectional view showing the structure of a view finder.

FIG. 68 illustrates the structure of a view finder provided in a video camera. A lens 57 and a display device are attached to a cylinder 59. The display device comprises a frame 58B, which is provided with a light source 30, a polarizing plate 23 and a liquid-crystal panel 20 attached thereto. A polarizing plate 26, an optical low-pass filter 10 and a polarizing plate 24 are fixed to the liquid-crystal panel 20 in the structure shown in FIG. 52.

Figure 69:
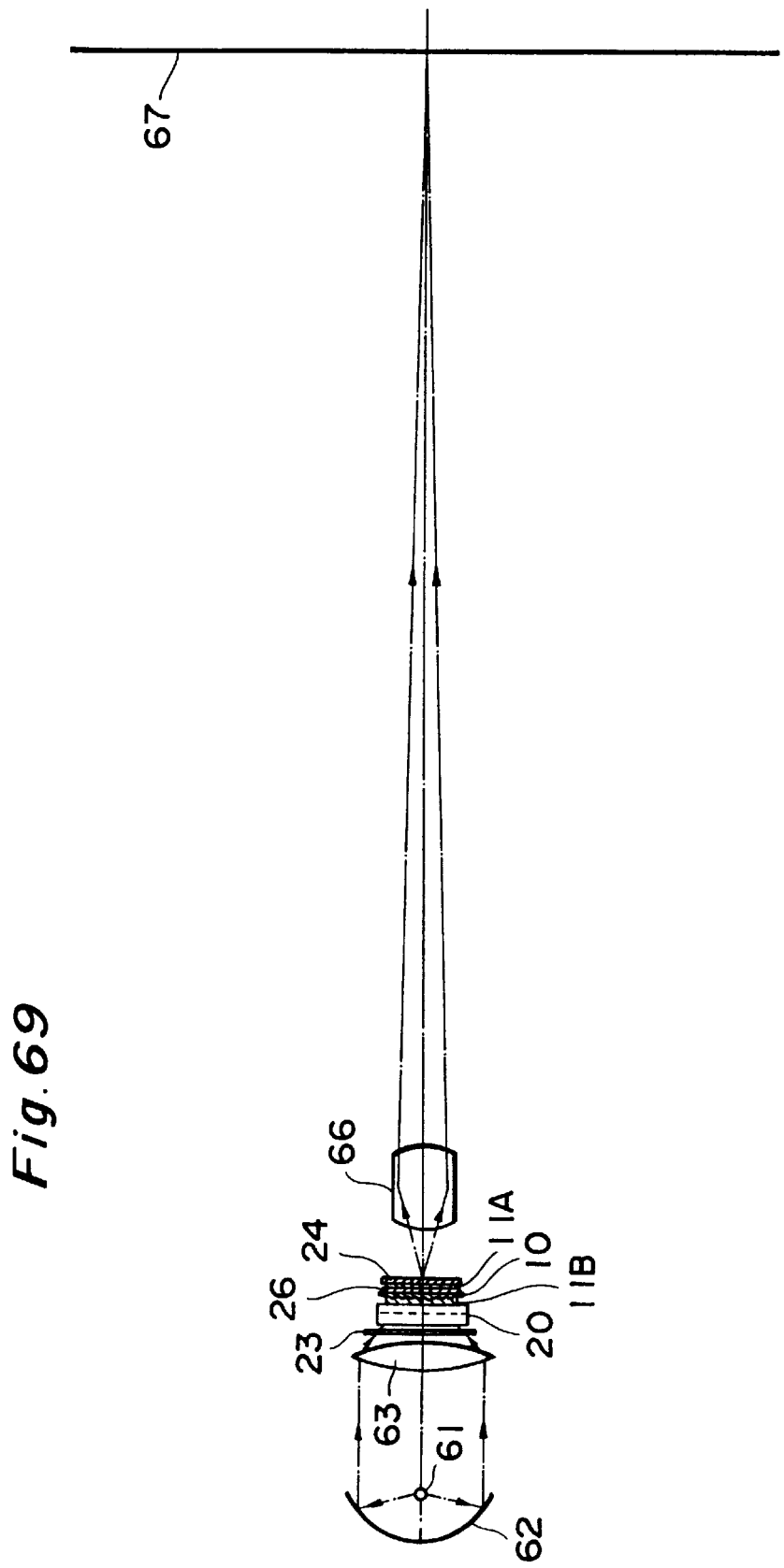
FIG. 69 is a cross-sectional view showing the structure of a TV projector.

FIG. 69 illustrates the optical structure of a liquid-crystal TV projector, which has basically the same as the structure shown in FIG. 42 except that the respective components in the structure shown in FIG. 53 are fixed to a liquid-crystal panel 20 in a liquid crystal display device.

Figure 70:
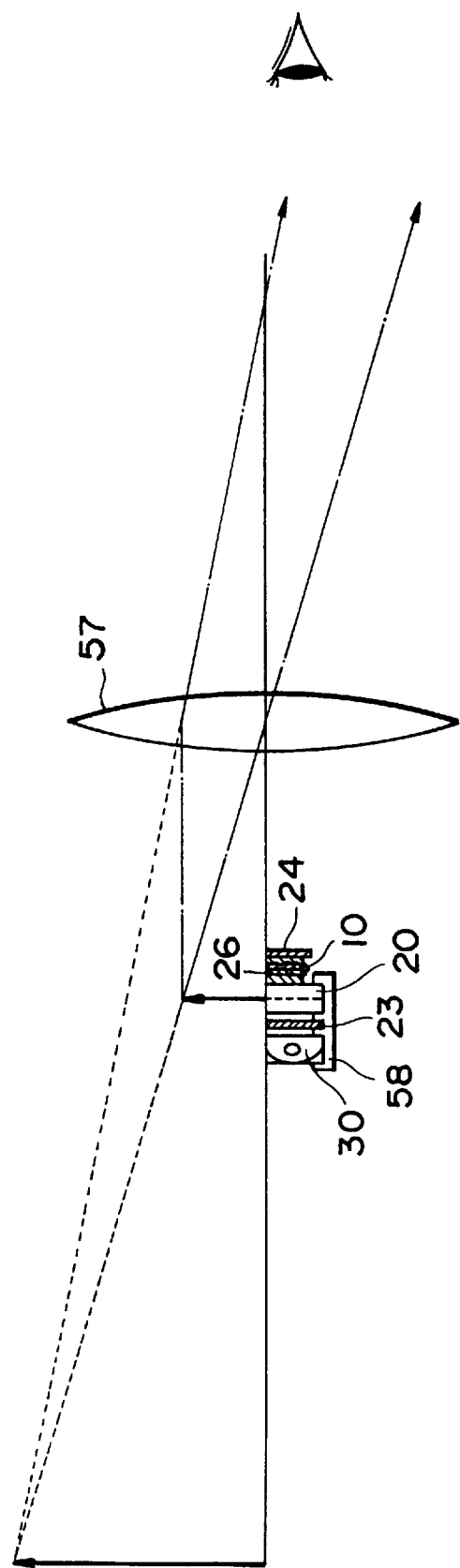
FIG. 70 is a diagram showing the optical structure of a head mount display device.

FIG. 70 illustrates an optical system of a head mount display device, which is the same as that shown in FIG. 44 except that the structure of a display device portion shown in FIG. 52 is used.

It goes without saying that the present invention is applicable to not only a liquid-crystal panel but also all other dot matrix-type display devices.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A dot matrix-type display device in which an optical low-pass filter is provided on a display screen, wherein said optical low-pass filter is fixed to a member included in said display device through an adhesive bonding layer having a refractive index different from the refractive index of said optical low-pass filter in a state where a surface having an optical function of said optical low-pass filter is directed to said member, and wherein a groove is formed on the outer periphery of the surface having an optical function of said optical low-pass filter, said groove preventing said adhesive bonding layer from sticking out with respect to sides of the surface.

2. A dot matrix-type display device in which an optical low-pass filter is provided on a display screen, wherein said optical low-pass filter is fixed to a member included in said display device through an adhesive bonding layer having a refractive index different from the refractive index of said optical low-pass filter in a state where a surface having an optical function of said optical low-pass filter is directed to said member, and wherein a sidewall is formed on the outer periphery of the surface having an optical function of said optical low-pass filter, said wall keeping a spacing between said optical low-pass filter and said member constant.

3. The dot matrix display device according to claim 2, wherein the sidewall has a same height at all locations.

4. A dot matrix-type display device in which an optical low-pass filter is provided on a display screen, wherein said optical low-pass filter is fixed to a member included in said display device through an adhesive bonding layer having a refractive index different from the refractive index of said optical low-pass filter in a state where a surface having an optical function of said optical low-pass filter is directed to said member, and wherein a spacer composed of a material having a refractive index substantially equal to that of said adhesive bonding layer is provided between the surface having an optical function of said optical low-pass filter and said member of said display device.

5. An optical device, comprising:

an optical low-pass filter; and a liquid crystal panel coupled to the optical low-pass filter by way of a bonding resin, wherein a groove is formed on the outer periphery portion of a surface of the optical low-pass filter having an optical function of the optical low-pass filter, said groove preventing said bonding resin from sticking out with respect to sides of the surface.

6. An optical device, comprising:

an optical low-pass filter; and a liquid crystal panel coupled to the optical low-pass filter by way of a bonding resin, wherein a wall is formed on the outer periphery portion of a surface of the optical low-pass filter having an optical function of the optical low-pass filter, said wall keeping a spacing between said optical low-pass filter and said liquid crystal panel constant.

7. A liquid-crystal display device, comprising:

a liquid-crystal panel;

two polarizing plates, whose polarization directions are perpendicular to each other, arranged with said liquid-crystal panel interposed therebetween;

a phase plate arranged between said polarizing plate on the side of a display screen and said liquid-crystal panel; and an optical low-pass filter integrally molded within said phase plate.

* * * * *